US006639684B1

(12) United States Patent
Knighton et al.

(10) Patent No.: US 6,639,684 B1
(45) Date of Patent: *Oct. 28, 2003

(54) DIGITIZER USING INTENSITY GRADIENT TO IMAGE FEATURES OF THREE-DIMENSIONAL OBJECTS

(75) Inventors: Mark S. Knighton, Santa Monica, CA (US); David S. Agabra, Pacific Palisades, CA (US); William D. McKinley, Los Angeles, CA (US); John Z. Zheng, San Gabriel, CA (US); David D. Drobnis, Mar Vista, CA (US); J. Douglas Logan, Cerritos, CA (US); Basel F. Bahhour, Riverside, CA (US); Jill E. Haynie, Santa Monica, CA (US); Kevin H. Vuong, Baldwin Park, CA (US); Amit Tandon, Torrance, CA (US); Kent E. Sidney, West Los Angeles, CA (US); Peter L. Diaconescu, Anaheim, CA (US)

(73) Assignee: NextEngine, Inc., Santa Monica, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 336 days.

(21) Appl. No.: 09/660,809

(22) Filed: Sep. 13, 2000

(51) Int. Cl.[7] .............................................. G01B 11/30
(52) U.S. Cl. ....................................... 356/601; 382/154
(58) Field of Search ................................ 356/601, 604, 356/613; 348/26, 128; 382/154

(56) References Cited

U.S. PATENT DOCUMENTS 3,636,250 A    1/1972   Haeff
4,089,608 A    5/1978   Hoadley
4,564,295 A    1/1986   Halioua
4,590,608 A    5/1986   Chen et al.
4,641,972 A    2/1987   Halioua et al.
4,657,394 A    4/1987   Halioua
4,705,401 A   11/1987   Addleman et al.
4,724,525 A    2/1988   Purcell et al.
4,737,032 A    4/1988   Addleman et al.
4,802,759 A    2/1989   Matsumoto et al.

(List continued on next page.)

FOREIGN PATENT DOCUMENTS

| DE | 4134546 A1 | 8/1993 | .......... G01B/11/03 |
| DE | 4313860 | 11/1994 | |
| WO | WO 99/58930 | 11/1999 | |

OTHER PUBLICATIONS www.pointcloud.com/pages/Home.html, "Point Cloud," 5 pages.

www. inharmonytech.com/venus3d.index.html, "Introducing Venus 3D," 4 pages.

deskeng.com/3dd.htm, "Desktop Engineering, The Complete Computing Resource for Engineers," 1977 Helmers Publishing, Inc., 1 page.

www.geometrixinc.com/mainwin.html, "Who says you can't build Rome in a day?", 4 pages.

*Primary Examiner*—Michael P. Stafira
*Assistant Examiner*—Vincent P. Barth
(74) *Attorney, Agent, or Firm*—Blakely, Sokoloff, Taylor & Zafman LLP

(57) ABSTRACT

A method and apparatus to digitize three-dimensional objects. A projection assembly is retained in fixed relation to an imaging assembly. The projection assembly projects a fixed gradient light pattern into a focal zone of the imaging assembly. The imaging assembly integrates the illumination over time such that the fixed gradient reveals the features of the three dimensional object.

19 Claims, 20 Drawing Sheets

U.S. PATENT DOCUMENTS

| | | |
|---|---|---|
| 4,846,577 A | 7/1989 | Grindon |
| 5,056,914 A * | 10/1991 | Kollodge .................... 348/135 |
| 5,067,817 A | 11/1991 | Glenn |
| 5,131,844 A | 7/1992 | Marinaccio et al. |
| 5,132,839 A | 7/1992 | Travis |
| 5,135,309 A | 8/1992 | Kuchel et al. |
| 5,175,601 A | 12/1992 | Fitts et al. |
| 5,216,817 A | 6/1993 | Misevich et al. |
| 5,218,427 A | 6/1993 | Koch |
| 5,231,470 A | 7/1993 | Koch |
| 5,237,404 A * | 8/1993 | Tanaka et al. .............. 348/128 |
| 5,285,397 A | 2/1994 | Heier et al. |
| 5,289,264 A | 2/1994 | Steinbichler |
| 5,307,292 A | 4/1994 | Brown et al. |
| 5,315,512 A | 5/1994 | Roth |
| 5,335,317 A | 8/1994 | Yamashita et al. |
| 5,337,149 A | 8/1994 | Kozah et al. |
| 5,377,011 A | 12/1994 | Koch |
| 5,414,647 A | 5/1995 | Ebenstein et al. |
| 5,432,622 A | 7/1995 | Johnston et al. |
| 5,471,303 A | 11/1995 | Ai et al. |
| 5,531,520 A | 7/1996 | Grimson et al. |
| 5,592,563 A | 1/1997 | Zahavi |
| 5,611,147 A | 3/1997 | Raab |
| 5,617,645 A | 4/1997 | Wick et al. |
| 5,621,529 A | 4/1997 | Gordon et al. |
| 5,627,771 A | 5/1997 | Makino |
| 5,636,025 A | 6/1997 | Bieman et al. |
| 5,646,733 A | 7/1997 | Bieman |
| 5,661,667 A | 8/1997 | Rueb et al. |
| 5,678,546 A | 10/1997 | Truppe |
| 5,689,446 A | 11/1997 | Sundman et al. |
| 5,704,897 A | 1/1998 | Truppe |
| 5,747,822 A | 5/1998 | Sinclair et al. |
| 5,771,310 A | 6/1998 | Vannah |
| 5,794,356 A | 8/1998 | Raab |
| 5,805,289 A | 9/1998 | Corby, Jr. et al. |
| 5,864,640 A | 1/1999 | Miramonti et al. |
| 5,870,220 A | 2/1999 | Migdal et al. |
| 5,880,846 A | 3/1999 | Hasman et al. |
| 5,907,359 A | 5/1999 | Watanabe |
| 5,910,845 A | 6/1999 | Brown |
| 5,944,598 A | 8/1999 | Tong et al. |
| 5,988,862 A | 11/1999 | Kacyra et al. |
| 5,995,650 A | 11/1999 | Migdal et al. |
| 5,999,641 A | 12/1999 | Miller et al. |
| 6,040,910 A | 3/2000 | Wu et al. |
| 6,057,909 A | 5/2000 | Yahav et al. |
| 6,091,905 A | 7/2000 | Yahav et al. |
| 6,100,517 A | 8/2000 | Yahav et al. |

* cited by examiner

DIGITIZER USING INTENSITY GRADIENT TO IMAGE FEATURES OF THREE-DIMENSIONAL OBJECTS

BACKGROUND

(1) Field of the Invention

The invention relates to an image capture device. More specifically, the invention relates to a low-cost three-dimensional digitizer.

(2) Background

There are four broad categories of non-contact three-dimensional digitizers. The first category is referred to as silhouette digitizers because the imaging device repeatedly takes the silhouette of the object as the object is rotated before the imaging device or the imaging device is rotated about the object. This type of digitizer is relatively ineffective at dealing with concavities in a three-dimensional object because the silhouette is unchanged by the concavity.

The second category is timing digitizers. Timing digitizers use a signal source such as a radar source. By determining the amount of time required for the signal to bounce back from the different points on the target object, surface features of the object are revealed. However, such digitizing methods are extremely expensive to implement.

A third category is projected pattern digitizers, in which a pattern of some sort is projected onto the object to be digitized and the dimensions of the object are determined from the interaction of the pattern with the object. Projected pattern digitizers fall into three main subcategories. The subcategories include contour digitizers which use spatial distortion from a projected pattern of contour lines to determine surface features of a three-dimensional object. A next subcategory is interference projected pattern digitizers, which use two sources and then based on the localized interference pattern of the two sources, determine the surface features of the three-dimensional object to be digitized. A third subcategory is referred to as color projected pattern digitizers because this category uses a projected color pattern and resulting color gradients to determine relevant information about the object to be digitized.

A final broad category is stereoscopic digitizers which employ multiple cameras to capture images of the object from different angles. From the picture, such systems perform feature identification. Then a correlation between the features in the different pictures is established to yield three-dimensional data.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 15b is an exploded view of the assembly of FIG. 15a.

DETAILED DESCRIPTION

Figure 1:
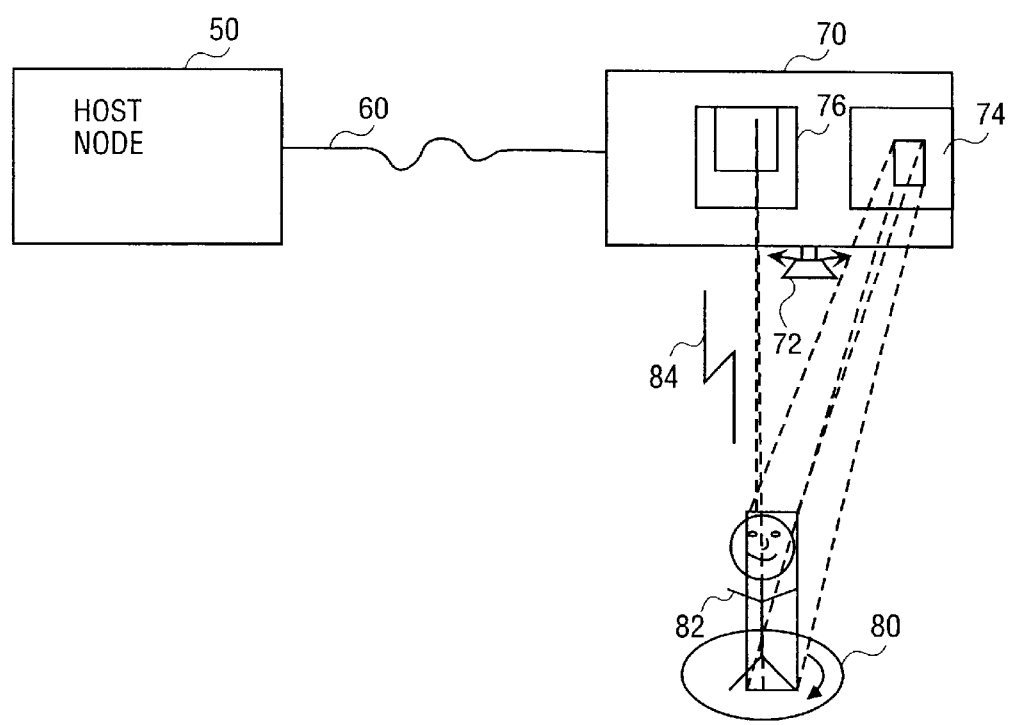
FIG. 1 is a block diagram of a system of one embodiment of the invention.

The system operates on the principle that depth data for a three-dimensional object may be calculated from an intensity difference resulting from an intensity gradient projected on the object. Existing image sensing arrays (ISAs) such as linear charge coupled device (CCD) sensors can detect illumination intensity to a high degree of accuracy. Based on this principle, if a light source is placed in fixed relation to the ISA such that the projected light forms an angle with the focal line of the ISA, and a gradient slide, for example, going from dark to light, from left to right, is interposed between the light source and the object, features of the object closer to the ISA are illuminated by greater intensity light than those features further away. Thus, the ISA captures a stripe of the object in which different intensities represent different depths of the object in that focal zone. This general principle works well for uniformly colored objects imaged in an otherwise dark environment, but different coloring and ambient light conditions may cause misinterpretations of the intensity data. However, if the ISA images the same stripe of the object under ambient conditions (e.g., when the light source is not illuminating the object within the focal zone) and images again when the object is illuminated by a uniform light (e.g., with no gradient (flat gradient)), these possible misinterpretations can be avoided.

Particularly, the ratio $V_{G1}-V_A/V_{G2}-V_A$ yields a differential that can be mapped to depth of the object. In the differential, $V_{G1}$ is the value from the ISA at a point resulting from the gradient exposure, $V_A$ is the value from the ambient exposure at that point, and $V_{G2}$ is the value at the point from a second gradient exposure such as the uniform light (flat gradient) or a second gradient created as described further below. The differential is computed for each point in the focal zone. Moreover, this differential also normalizes the effect of color variations and ambient light conditions. Notably, the differential is also substantially independent of intensity of the light source. Unfortunately, as a practical matter, changing slides and/or turning the light source on and off rapidly enough to permit digitization of many possible target objects is both expensive and problematic.

However, by taking advantage of the fact that the ISA integrates over time, the same effect may be created mechanically using a shutter which causes 0% to 100% of the light to illuminate the target object within the focal zone during the cycle. Moreover, by overdriving the shutter, the white light condition and ambient condition, can be created. Specifically, if the imaging time of the CCD is 5 milliseconds, in an initial 5 milliseconds the shutter does not impinge on the light source, thereby allowing the imaging sensing array to image the fully illuminated object. The next 5 milliseconds, the shutter passes from 0 to 100% blockage of the light, thereby creating the intensity gradient within the focal zone. During the next 5 milliseconds, the shutter continues to drive so that the light is entirely blocked and the ambient condition image is obtained. The processing of each of these images (including the creation of the differential) may be offloaded to an attached host as discussed in greater detail below.

An intensity gradient may alternatively be created by sweeping the light through the focal zone. For example, by sweeping a light stripe from left to right through the focal zone, the ambient light image may be captured before the light enters the zone. A first gradient is captured from the first entry of the light into the zone until the light is entirely within the zone. A second gradient is captured as a light translates out of the zone to the right. The second gradient is the opposite of the first gradient and is not flat as in the fully illuminated case. An analogous set of images may be captured as the light sweeps back from left to right. One advantage of sweeping the light is that two gradients are generated as the light moves from right to left and two gradients are generated as the light moves from left to right. Thus, the sweeping can be performed at half speed without a reduction in imaging performance.

The differential may take the same form as discussed above. Alternatively, the differential may be computed as $X_1/(X_1+X_2)$, where $X_1=V_{G1}-V_A$ and $X_2=V_{G2}-V_A$. To reduce noise sensitivity, the larger magnitude gradient should be selected for the numerator of the ratio. Color intensity is given by $X_1+X_2$.

It is possible to calculate the depth data directly from the intensity information. However, the speed and processing power required is reduced when a lookup table (LUT) based on a prior calibration is employed to derive depth data based on the differentials. Accordingly, the embodiment of the invention maintains a LUT and indexes into the LUT based on the differential.

FIG. 1 is a block diagram of a system of one embodiment of the invention. A digitizer 70 is coupled to a host node 50. This coupling may be by a bus 60 such as the Universal Serial Bus (USB), IEEE 1394 bus, or any other suitable data transfer system. It is also within the scope and contemplation of the invention for the digitizer to communicate with the host mode via a wireless interconnection. Host node 50 may be a personal computer, a work station, an internet appliance, or any other device that provides sufficient intelligence and processing power to render images from the data obtained by the ISA. The digitizer 70 captures image data and may forward it to the host node 50 for rendering. In this way, the processing on the digitizer 70 may be limited, permitting lower cost construction.

The digitizer 70 includes a projector to project a stripe of white light through a projection window 74 onto a remote object such as a person 82 on a turntable 80 remote from the digitizer. The digitizer also contains an image sensing array (ISA) aligned with an image capture window 76 which captures the image of the object 82 within a focal zone. In one embodiment, the ISA is a linear charge coupled device (CCD) or complementary metal oxide semiconductor (CMOS) sensor, and the focal zone is a line on the target object. In some embodiments, the digitizer includes a base 72 about which the upper unit, including the projector and the ISA, can rotate in either direction. This permits the focal line to be swept back and forth across a target object through an arc. This sweeping reduces the loss of detail in the captured image that results from shadowing on the object from the perspective of an immobile focal line. The digitizer 70 also includes a wireless interface to communicate with a turntable 80 via a wireless link 84.

Turntable 80 may be the type described in co-pending application entitled Wireless Turntable, Ser. No. 09/660,810, assigned to the assignee of the instant application. Via wireless link 84, the digitizer sends commands to the turntable 80 and receives from the turntable indications of the angular position of the turntable surface relative to a home position. When the digitizer is activated, it searches for the turntable 80 by sending a signal to which the turntable 80 is required to respond. If the turntable responds, the digitizer looks for a predetermined pattern that is expected to be present on the turntable surface. For example, the pattern may be concentric circles on the turntable surface. In such case, based on the image captured, the digitizer can both find the turntable and determine its distance from the digitizer. Then after the response is received, the digitizer sends a "go home" signal to the turntable. In some embodiments, the digitizer sends acceleration and rotation profiles to the turntable to control its rotation. Each profile may be retained in firmware on the digitizer or downloaded from host node 50.

Generally speaking, the projection portion of the digitizer 70 is retained in fixed relation to the imaging portion. The projection portion produces a light stripe as noted previously on the object 82. By either sweeping the light stripe back and forth through the focal line or by mechanically blocking the stripe at a known rate, the intensity gradient can be created. In one embodiment, the blocking is from 0% to 100% during a cycle. Because the ISA integrates the illumination over time, the outline of a three-dimensional surface is reflected in the data captured by the ISA. This is because protruding features will remain illuminated longer. Accordingly, more photons are captured by the ISA corresponding to those features. After repeating this process one stripe at a time as the object is rotated by turntable 80 or through the course of sweeping the entire digitizer back and forth as it rotates about the base, cost effective three-dimensional imaging is effected. The digitizer may also be used to capture high resolution scans of two dimensional objects by sweeping back and forth across the object. This feature is particularly desirable in the context of digitizing works of art.

Figure 2:
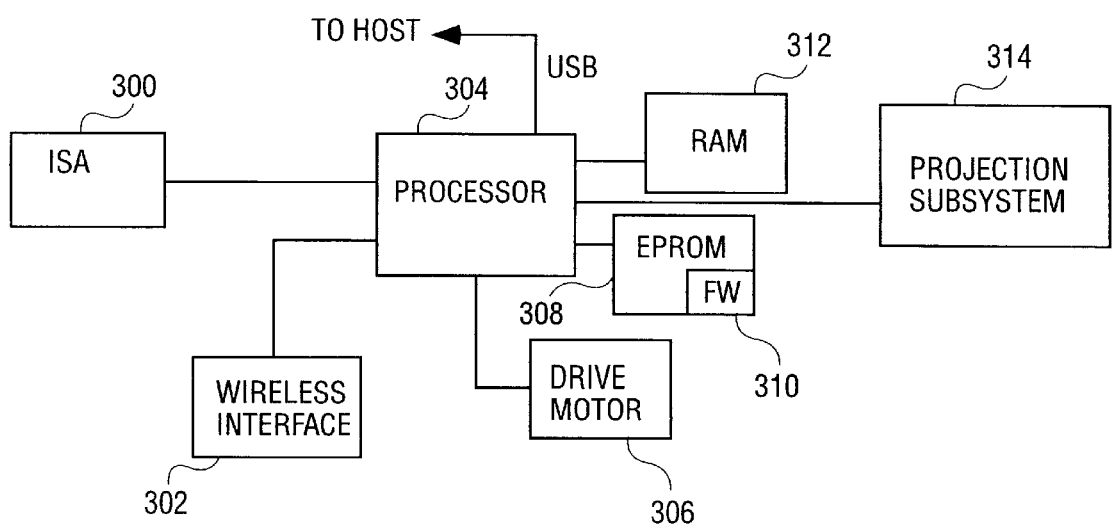
FIG. 2 is a block diagram of a control subsystem of one embodiment of the invention.

FIG. 2 is a block diagram of the control subsystem of one embodiment of the invention. The processor 304 is coupled to a random access memory (RAM) 312 and an erasable programmable read only memory (EPROM) 308. The EPROM 308 contains firmware necessary for booting the processor and may, for example, include rotation profiles and the command set for the wireless turntable. The wireless interface 302 is used by the processor 304 to signal the wireless turntable. The processor 304 is coupled to the ISA 300 which sends image data to the processor for storage in the RAM 312 or to be forwarded to the host over USB or other suitable connection. The processor 304 also controls the drive motor 306 to affect sweeping rotation of the digitizer. The processor 304 also controls projection subsystem 314, particularly whether the light source is on or off, as well as in certain embodiments, the activation and deactivation of the shuttering or sweeping of the light beam. The same general control structure is employed in the various mechanically varying embodiments of the invention described below.

Figure 3:
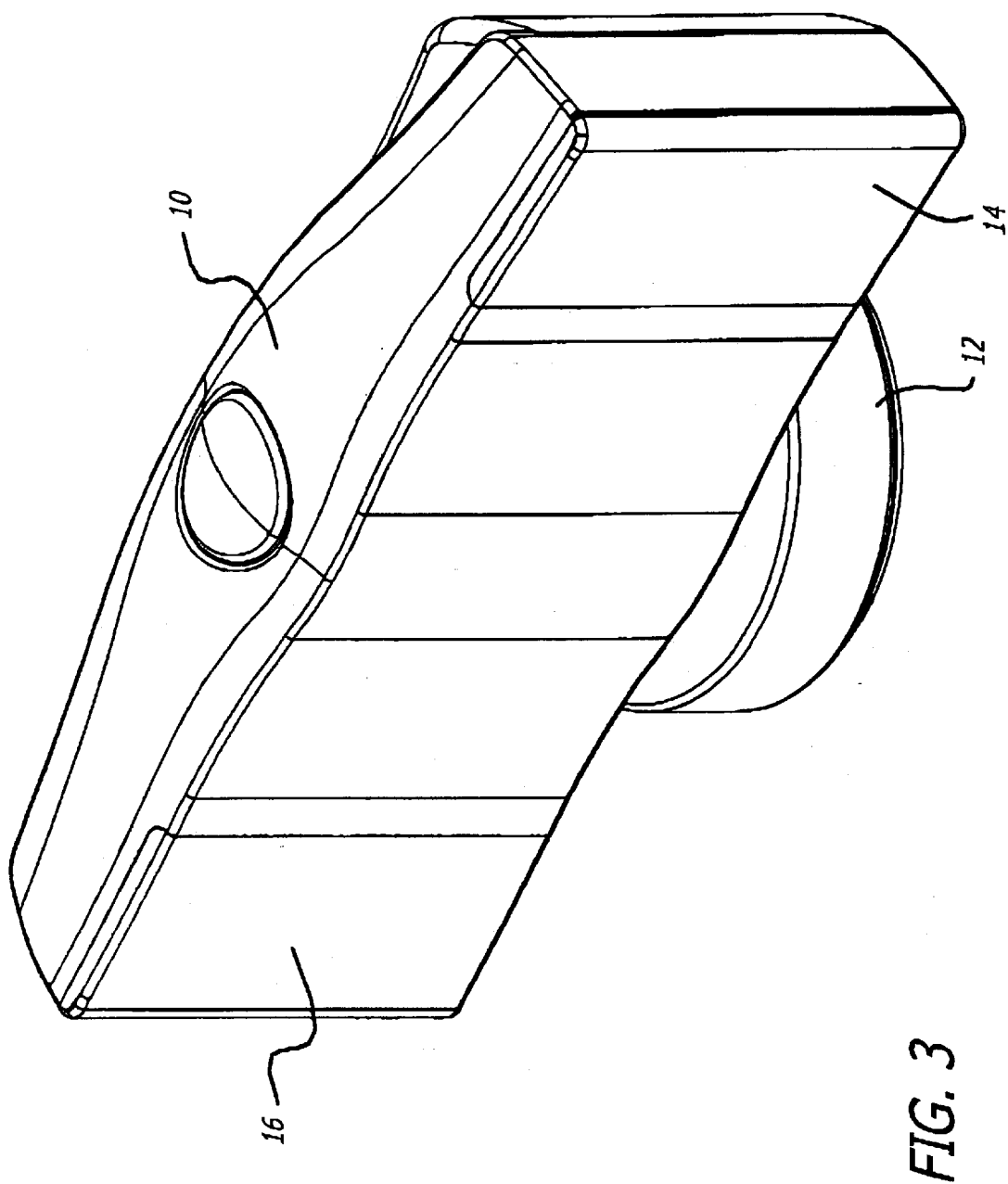
FIG. 3 is a perspective view of a digitizer of one embodiment of the invention.

FIG. 3 is a perspective view of a digitizer of one embodiment of the invention. A housing 10 is coupled to a base 12. In some embodiments, the coupling between housing 10 and base 12 may be a rotatable coupling, such that the housing 10 projection and imaging units within may be rotated axially about base 12. Housing 10 defines a projection window 14 and an image capture window 16. In one embodiment, housing 10 is molded out of ABS. Housings made of other plastics or metal are all are within the scope and contemplation of the invention. The material used for the windows may vary from one embodiment to the next, depending on the optics employed within the housing.

Figure 4:
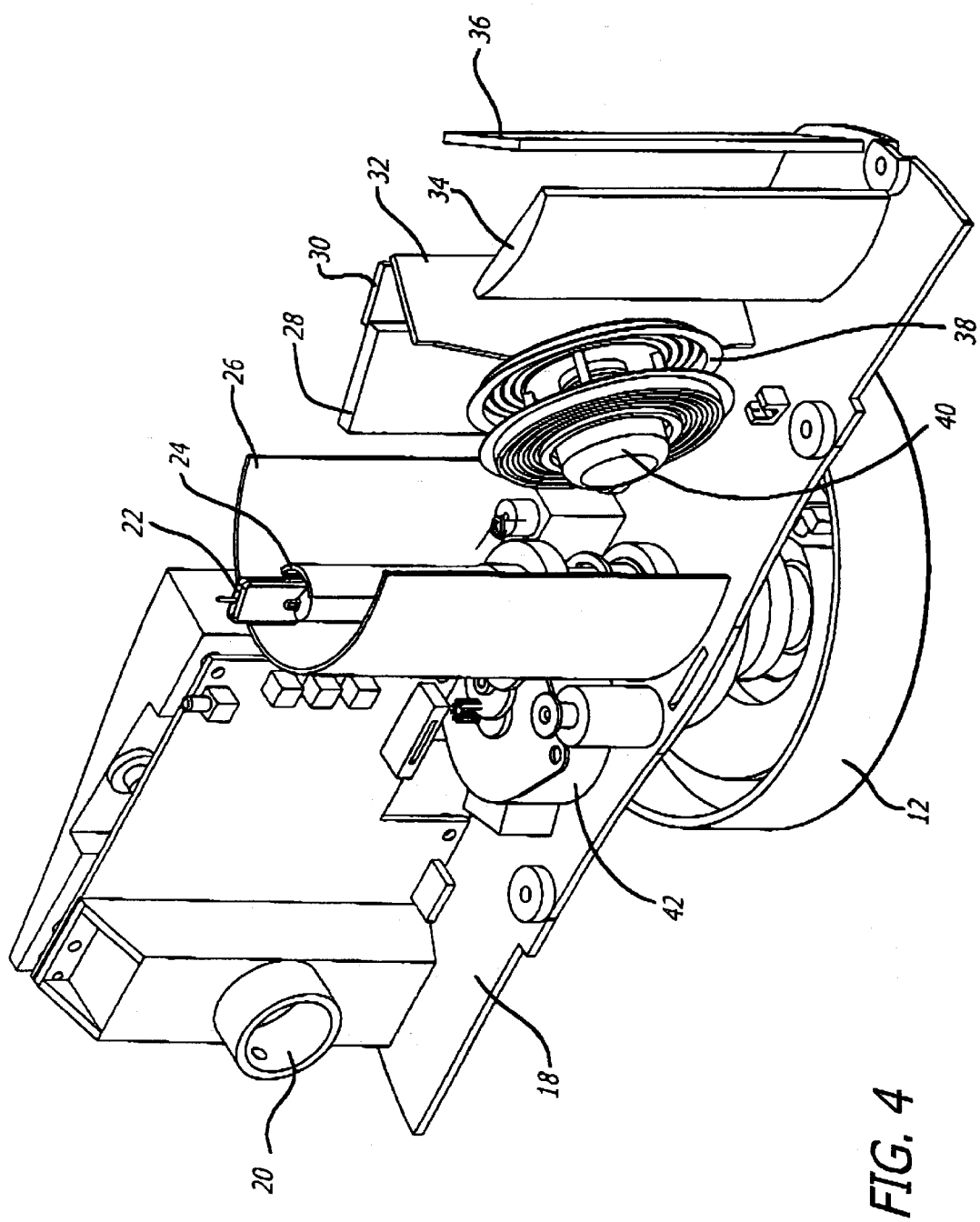
FIG. 4 is a perspective view of a digitizer of one embodiment of the invention with a portion of the housing removed.

FIG. 4 shows a perspective view of a digitizer of one embodiment of the invention with a portion of the housing removed. A mounting plate 18 which forms the bottom of the housing serves as the mounting surface for most of the internal components. A motor 42 is also mounted to the mounting surface to drive rotation of the assembly about the base 12. The requisite gear assembly may be arranged to reside in the housing and/or the base. A camera case 20 retains a lens in optical communication with an ISA. The camera case 20 prevents ambient light from distorting the image captured by the ISA. Also mounted in a fixed position relative to where the camera case 20 is a light source 22. Adjacent to the camera case 20 is a circuit board, including a processor and a memory that provide the brains and storage, respectively, for the digitizer.

A wireless interface is also provided and may signal the turntable (not shown) through the imaging windows. The wireless interface may for example be an infrared interface or a radio transceiver, either of which may employ well understood protocols for sending and receiving information from the turntable. In one embodiment, light source 22 may be a 300 watt halogen tube. A first elliptical reflector 24 is mounted on one side of the light source 22, while a second elliptical reflector 26 is mounted on the other side of the light source 22. In this manner, the first elliptical reflector 24 focuses the light from light source 22 back on the second elliptical reflector 26, which in turn, focuses a light to a focal point some distance from the light source. In one embodiment, first elliptical reflector 24 is semi-circular. Mounted at that focal point is a light homogenizer 28, which in one embodiment of the invention, may be polished float glass. The float glass basically functions as a light pipe that uniformly distributes the intensity such that a substantially uniform intensity light stripe exits the terminal side of the float glass.

Coupled to the float glass is a light folding mirror 30, which is used to fold the light projecting out of the homogenizer 28 on itself. By folding the light, a smaller size lens may be employed subsequently to focus the light on a target object. In one embodiment, the folding mirror 30 is omitted and a larger lens is used. A lens 34 is mounted to focus light from the light source through the projection window to a location remote from the digitizer. An additional mirror or mirrors 36 may be employed to ensure optical communication between the light source 22 and the lens 34. The lens 34 and other optical component may be manufactured from various suitable materials known in the art.

A shutter blade 32 is mounted, such that when driven, it will impinge on the light exiting the homogenizer, such that it varies between blocking 0% and 100% of that light from reaching the lens 34. The shutter blade is mounted to a spider 38, such as might be found in a conventional stereo speaker, which is driven by an electromagnet 40. In this manner, the shutter can be driven to pass through an entire cycle of 0% to 100% blockage, in a hundredth of a second. Moreover, the spider mechanism has been found to be quite smooth, resulting in minimal mechanical vibration, which might otherwise have deleterious effects on the imaging of the system. In an alternative embodiment, the shutter may be mounted to a pair of leaf springs and driven by coil.

Figure 5:
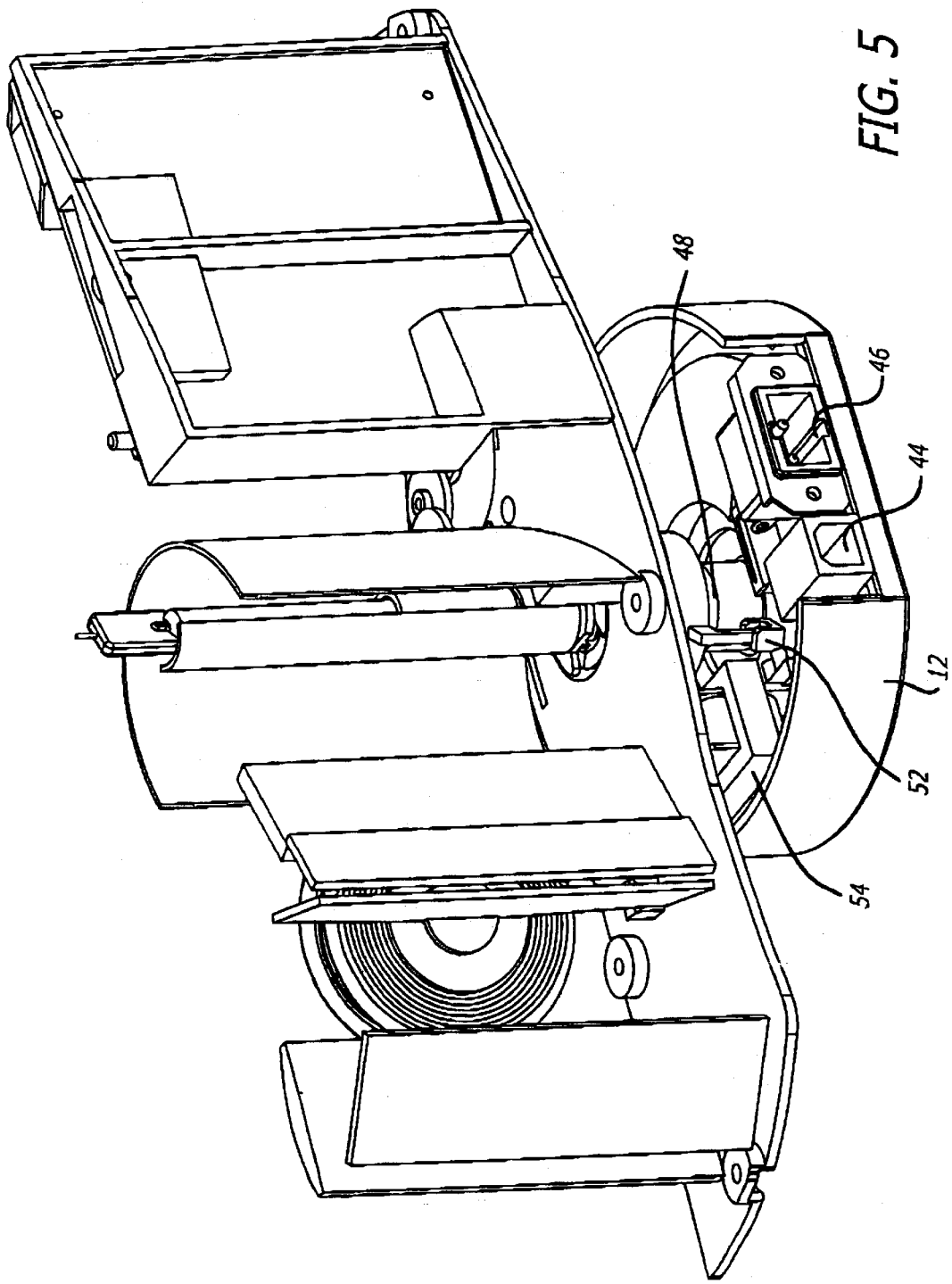
FIG. 5 is a rear perspective view of one embodiment of the digitizer with a portion of the housing and base removed.

FIG. 5 is a rear perspective view of one embodiment of the digitizer with a portion of the housing and base removed. The housing and its projection and imaging subsystems are mounted on a central post 48 extending from a floor of base to engage the mounting platform 18 of the housing. A bronze bushing may be used around the central post to aid in achieving smooth rotation. By using a hollow axial post 48, the overall height of the unit is reduced as in such an embodiment the light source may be mounted to extend it down within the post 48.

Transformer 54 resides within the base and is used to power the various systems of the digitizer. An optical interrupter for 52 is used to identify where the upper unit is relative to the base as it rotates about the axis 48. To effect this, one or more blades are molded to interrupt the sensor as the upper unit rotates. A USB port 44 is provided to permit data to be sent back and forth to a host node. Other type of ports could be used instead or in addition to USB. An AC power port 46 is similarly provided within the base to provide the power to transformer 54.

Figure 6:
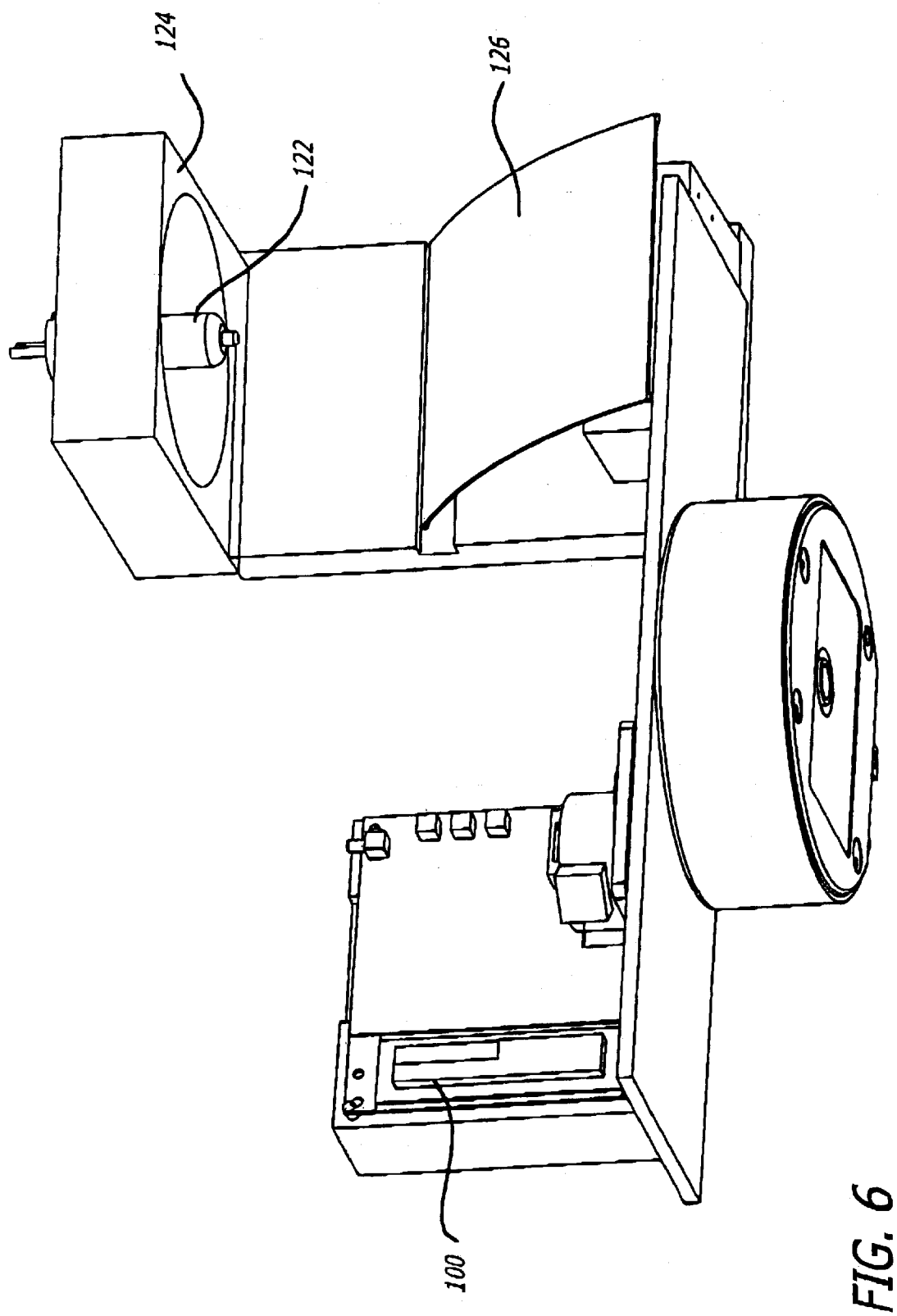
FIG. 6 is a bottom perspective view of a digitizer of one embodiment of the invention using an alternative optics arrangement.

FIG. 6 is a bottom perspective view of a digitizer of one embodiment of the invention using an alternative optics arrangement. A portion of the camera case is removed to reveal the image sensing array 100, which in one embodiment of the invention, may be a 5340 pixel linear image sensor, such as the one available from Toshiba America, Inc. of New York, N.Y., available under the part number TCD2558D. The light source 122 is mounted within a parabolic reflector 124, which focuses the light from light source 122 onto a curved reflector 126. In one embodiment, the light source 122 is a 150 watt single end halogen bulb. The curved reflector 126 spreads the light into a light stripe that is then reflected through the projection window onto the target object at a predetermined distance from the digitizer. The curved reflector 126 may be moved back and forth to sweep the light stripe through the focal zone on the target object. The reflectors may be manufactured from plastic or polished metal. In one embodiment, stamped aluminum is used.

Figure 7:
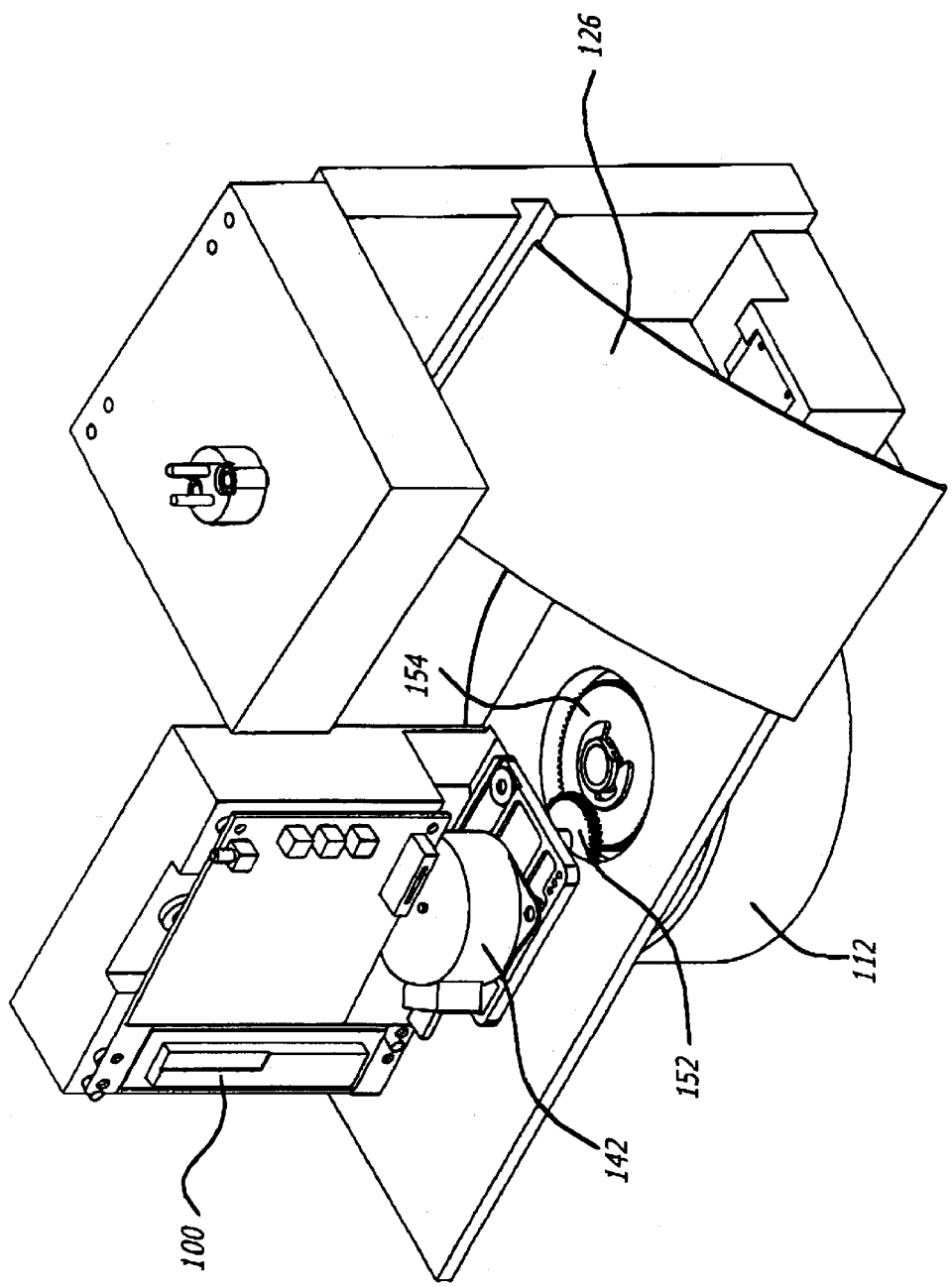
FIG. 7 is a top perspective view of the embodiment of the digitizer of FIG. 6.

FIG. 7 shows a top perspective view of the embodiment of the digitizer of FIG. 6. The curved reflector 126 can still be seen beneath the light source (not shown). Motor 142 drives a gear assembly 152, which engages drive gear 154 to permit rotation of the upper unit, including the projection system (light source and reflectors) and the image sensing array 100 about the base 112. By rotating about the base, the digitizer is provided with an additional degree of freedom, which facilitates scanning in some situations, as described in more detail below.

Figure 8A:
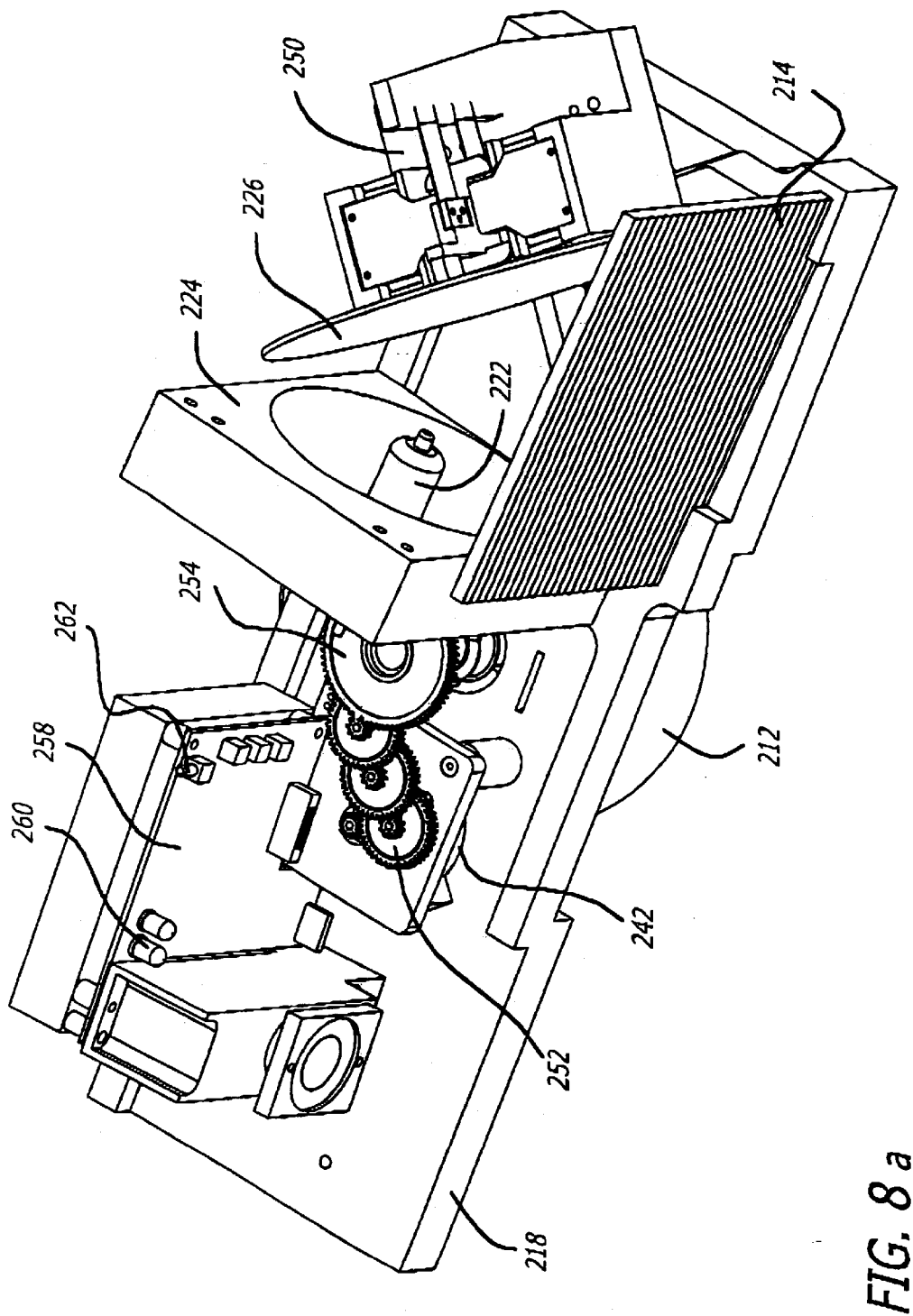
FIG. 8a is an additional alternative embodiment of a digitizer of one embodiment of the invention.

FIG. 8a shows an additional alternative embodiment of a digitizer of one embodiment of the invention. Similar to the embodiment discussed with reference to FIG. 6 and FIG. 7, this embodiment uses parabolic reflector 224 in conjunction with light source 222 to produce a spotlight. However, rather than using a curved reflector (which performs a light spreading function), a flat reflector 226 is employed to reflect the spot of light to the projection window 214. Projection window 214 is manufactured from a pane of glass or plastic to have a plurality of concave or convex ridges. Each such ridge acts as a lens spreading the light thereby changing the spot of light to a light stripe which has relatively good intensity uniformity from top to bottom. A magnetic drive unit 250 is used to move reflector 226 back and forth to cause the spot of light to move back and forth across the projection window 214 and, therefore, the light stripe to move back and forth across in the focal line of the ISA. It is also within the scope and contemplation of the invention to effect the sweeping by moving the light source and parabolic reflector while maintaining the other reflector stationary.

In one embodiment, an IR filtering or hot mirror (not shown) is interposed between the light source 222 and the reflector 226. A fan may be introduced between the IR filter and the light source 222 to cool the light source 222. However, in such an embodiment, partitions may be desirable such that the housing, in conjunction with the partitions, the IR filter, and the parabolic reflector 224 form a fan enclosure which prevents turbulence created by the fan from disturbing the regular movement of reflector 226. The motor 242 is provided to drive gear assembly 252, which in turn drives major gear 254, thereby causing the upper portion 218 of the digitizer including the projection unit and the imaging unit to rotate about the base 212. This permits the digitizer to sweep back and forth while scanning an object. Thus, an object some distance from the digitizer may be scanned, for example, 90° of the object at a time, requiring only four rotations by the turntable. In one embodiment, the gear ratio is 512. Similar motor and gear assemblies may be used in each of the various above described embodiments. It is, of course, possible for the digitizer to image an object continually rotated by the turntable. The sweeping the focal line (even in a continually rotating environment) also permits features to be more accurately identified than would be possible with an immovable focal zone. Particularly, sweeping the focal line reduces inaccuracies due to shadowing.

The electronics board 258 is substantially the same as in the other embodiments, as is the imaging subsystem. Wireless signaling interface 260, which in this embodiment is a infrared signaling interface, signals the turntable through the imaging window. An activation switch 262 is supplied on the electronics board 258 to permit the system to be activated.

Figure 8B:
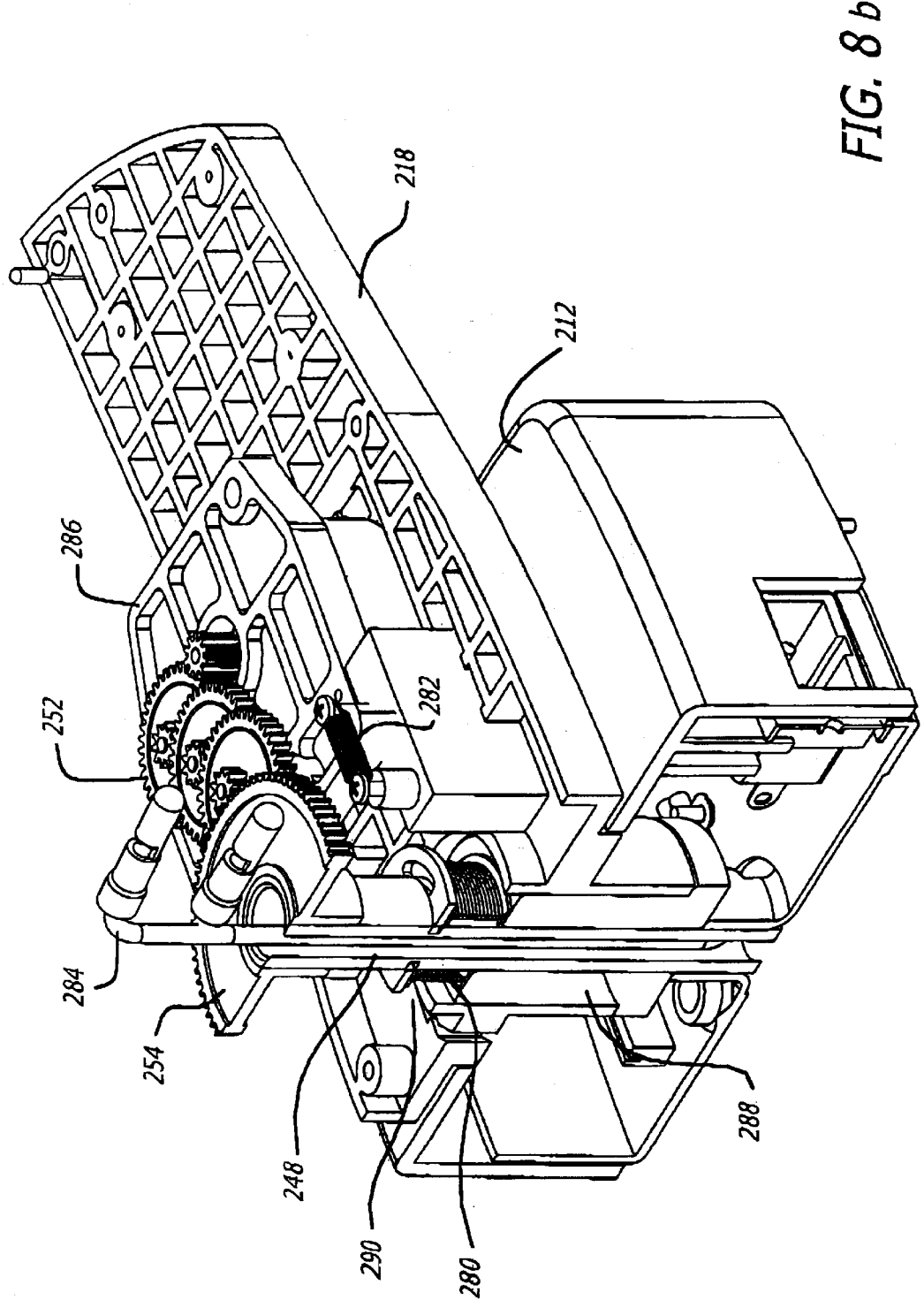
FIG. 8b is a sectional perspective view of a portion of one embodiment of the invention.

FIG. 8b is a sectional perspective view of a portion of one embodiment of the invention. Gear assembly 252 is mounted on gear box 286. Gear box 286 is elastically coupled to the lower unit by bias spring 282. Bias spring 282 biases gear assembly 252 into engagement with major gear 254. Additionally, bias spring 282 biases the shaft 248 to lean in a consistent direction. This is desirable, because if the shaft were free to float from side to side, even given quite tight tolerances, that minor variation at the digitizer may represent a significant deviation eight feet away in the focal zone. Thus, absent some biasing mechanism to ensure consistency in the shaft, risk of lost data is increased.

Anti-vibration spring 280 is compressed between washer 290 that moves with the shaft and bushing 288 that moves with the upper unit. As a result, anti-vibration spring 280 increases rigidity of the upper unit and prevents vibration and wobble from side to side. Use of these bias springs permits a less expensive bearing with greater tolerances to be used. Power cables 284 are fed through the hollow shaft 248 to provide power to the light source (not shown).

Figure 9:
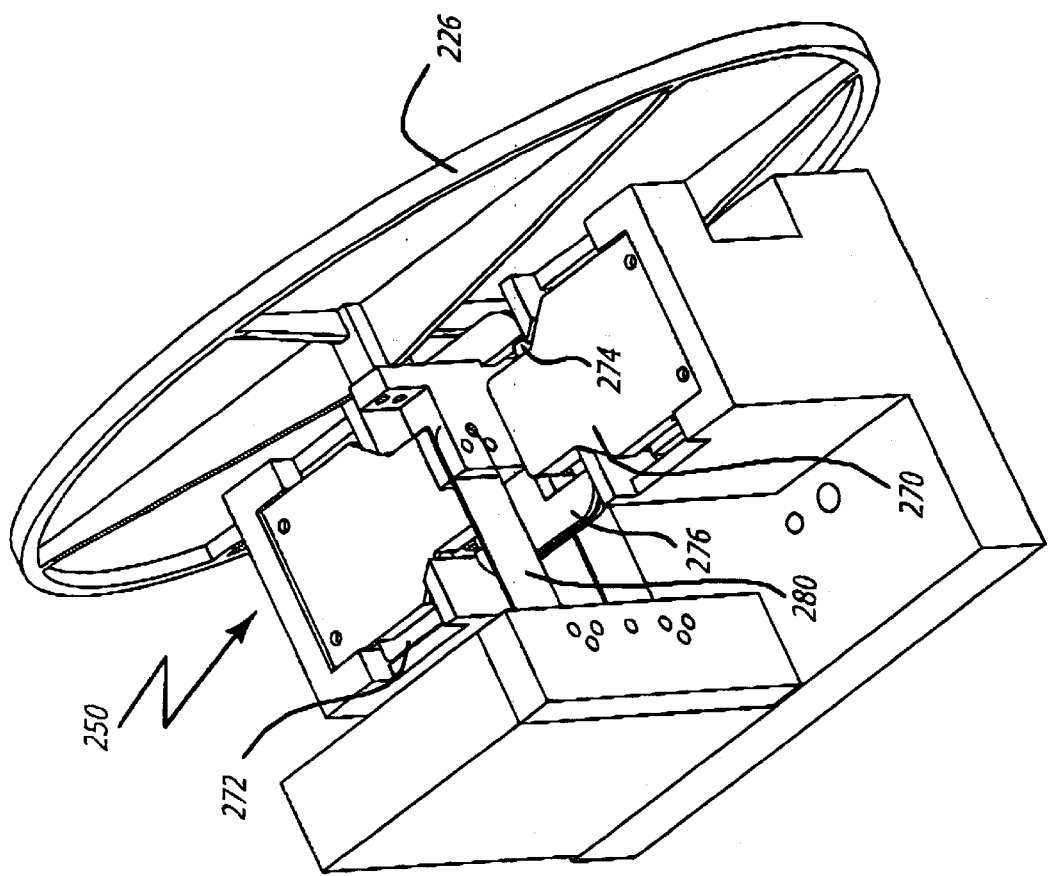
FIG. 9 is a perspective view of a magnetic drive unit of one embodiment of the invention.

FIG. 9 is a perspective view of a magnetic drive unit of one embodiment of the invention. As previously noted, the reflector 226 is coupled to the magnetic drive unit 250. Specifically, it is coupled to an arm 276 which is able to pivot in a horizontal plane. The distance of pivot is controlled to some degree by a pair of spring steel bands 280, which provide a restraining force against rotation from a central position. A first magnet 270 having a first polarity is positioned on one side of the arm 276. A second magnet having the opposite polarity is positioned on another side of arm 276. A coil 274 runs around the arm and between the first and second magnets 270 and 272. When the coil is pulsed with current, the magnets 270 and 272 intermittently apply torque to the arm 276. The result is that arm 276 moves back and forth in an arc within a horizontal plane. Movement of the arm 276 is translated to movement of the reflector 226, and consequently, sweeping back and forth with the light beam reflected thereby. This system employs certain resonance principles to improve energy efficiency such that the power cost of sweeping the reflector is quite low.

Figure 10A:
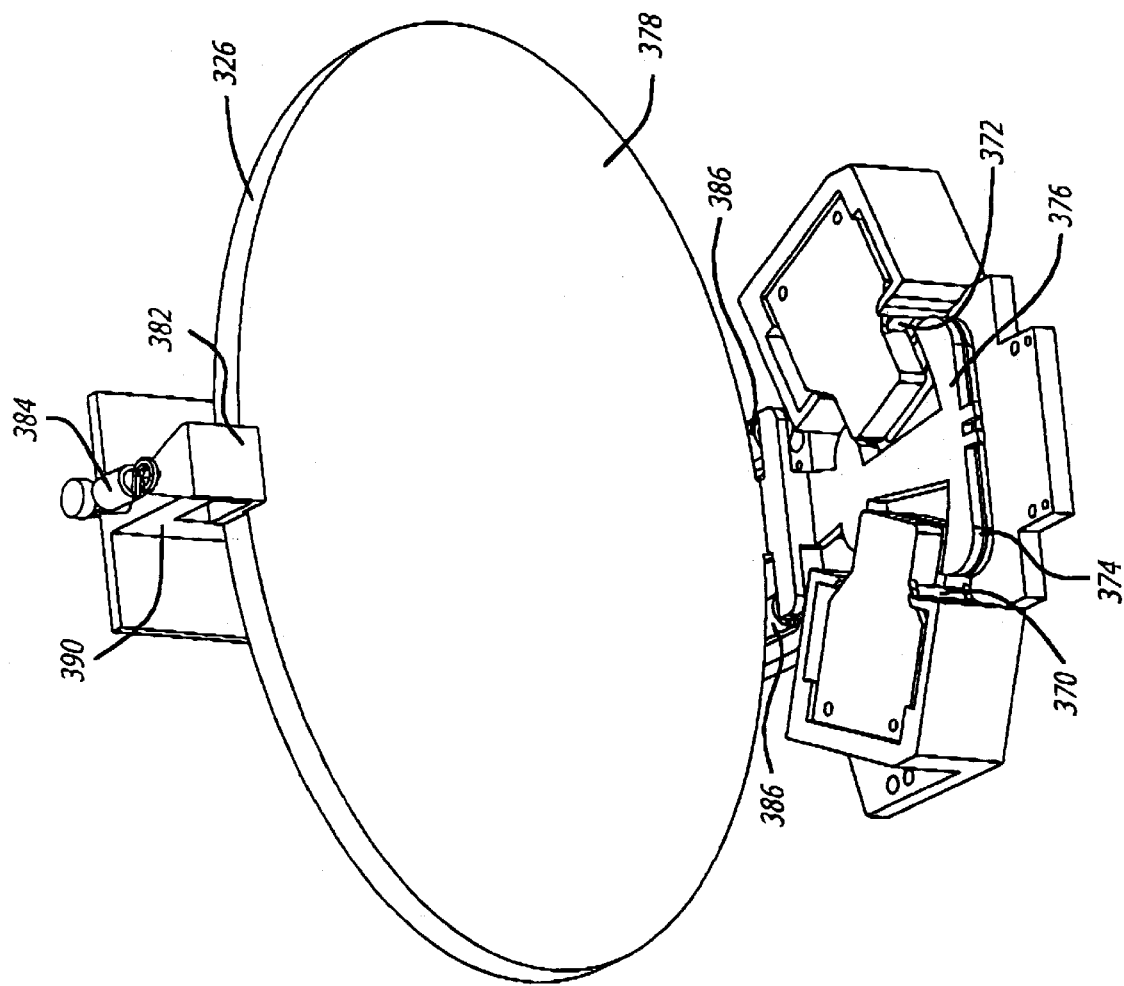
FIGS. 10a–c are perspective views of components of a magnetic drive and reflector assembly of another embodiment of the invention.
Figure 10B:
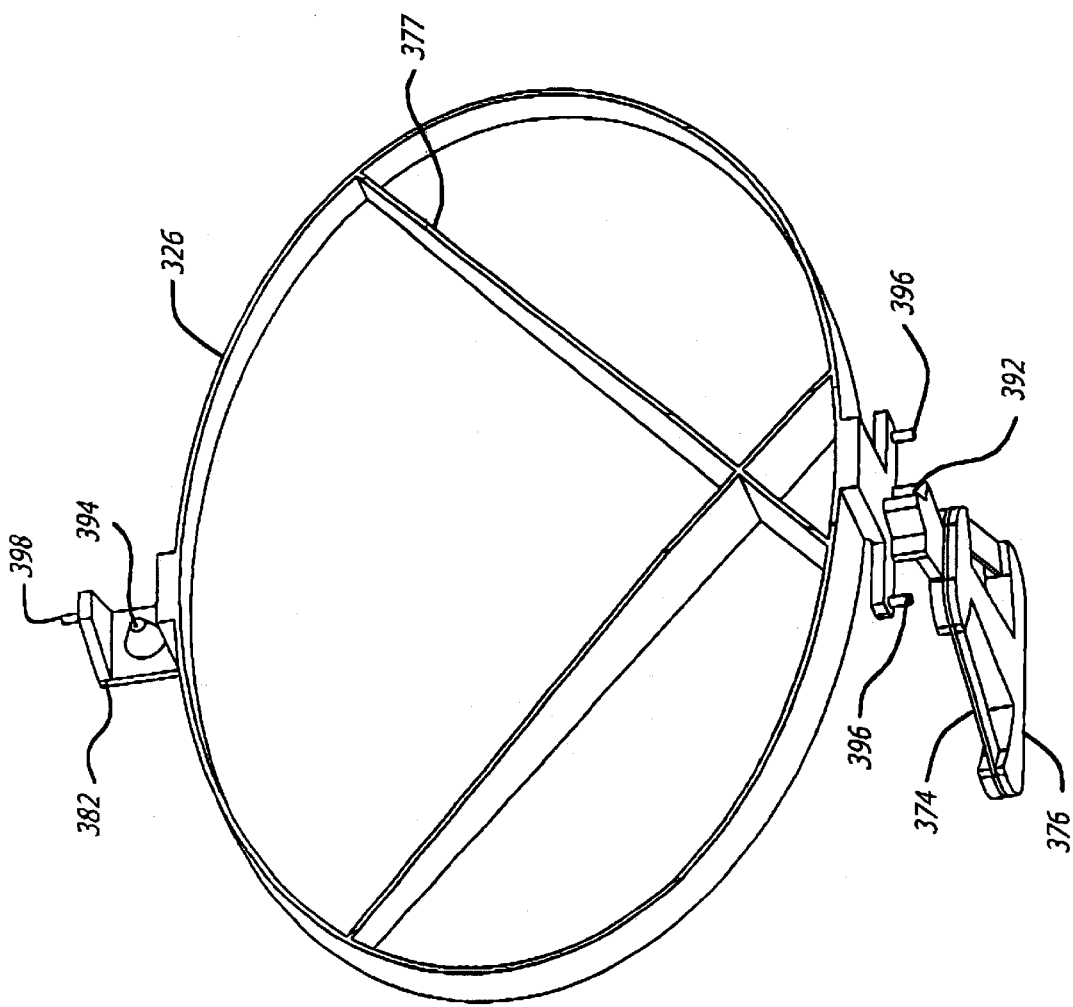
Figure 10:
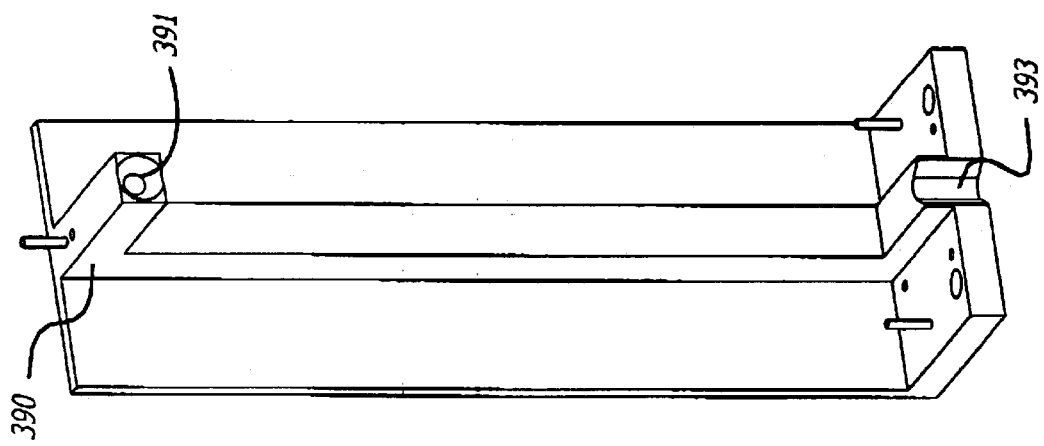

FIGS. 10a–c show perspective views of components of a magnetic drive and reflector assembly of one embodiment of the invention. The reflector magnetic drive assembly as shown in FIG. 10a is similar in many respects to that shown in FIG. 9. However, rather than mounting the magnetic drive portion behind the reflector, it is mounted in front and below the reflector. Thus, first magnet 370 having a first polarity is positioned on one side of arm 376, and a second magnet having the opposite polarity is positioned on another side of arm 376. A coil runs around the arm between first and second magnets 370 and 372. When the coil is pulsed with current, the magnets 370 and 372 intermittently apply a torque to the arm 376. The result is that arm 376 moves back and forth in an arc within a horizontal plane.

Movement of the arm 376 is translated into movement of the reflector 326, and consequently, sweeping back and forth of the light being reflected thereby. The reflector 326 is mounted on a fulcrum post 390. No spring steel bands are provided. Rather, a pair of springs 386 are coupled at the base of the mirror to provide opposing restraining forces to cause the mirror to move back and forth in a resonant manner. The spring constants of springs 386 dictate the resonance frequency, which translates to the sweep rate. This mounting results in smooth consistent low friction movement of the reflector during operation. In one embodiment, the springs 386 are selected to yield a resonance frequency of approximately 50 Hz. A much smaller spring 384 is coupled to fulcrum post 390 and mounting clip 382. The purpose of spring 384 is merely to hold the reflector into the circular fulcrum member discussed below. By having the springs 386 which dictate the resonance frequency of the apparatus positioned at the bottom of the reflector to be moved, the torque created by the magnetic attraction and repulsion of the arm 376 is applied significantly more proximately to those springs 386 than were they at the top of the reflector, thereby improving system efficiency. Additionally, a light weight reflector can be used without risking deformation of the reflector during operation.

FIG. 10b shows a rear perspective view of the reflector and arm assembly. Supporting members 377 that provide structural rigidity to the reflector 326 are minimized to reduce weight of the overall structure that must be moved. A circular fulcrum engaging member 394 is molded on mounting clip 382. Upper spring engaging post 398 is also coupled to mounting clip 382. An extension of the arm 376 forms lower fulcrum engaging end 392. Lower spring mounting posts 396 are also evident.

FIG. 10c shows a perspective view of the fulcrum mounting post 390. A fulcrum mounting post defines an upper circular fulcrum 391 and a lower channel fulcrum 393. This fulcrum arrangement prevents lateral shifting of the reflector 326 and ensures a clean pivot side to side. The fulcrum defines a true pivot point with minimal frictional engagement. Mounting the magnetic drive below and in front of the reflector to be moved, permits a more compact finished system.

Figure 11:
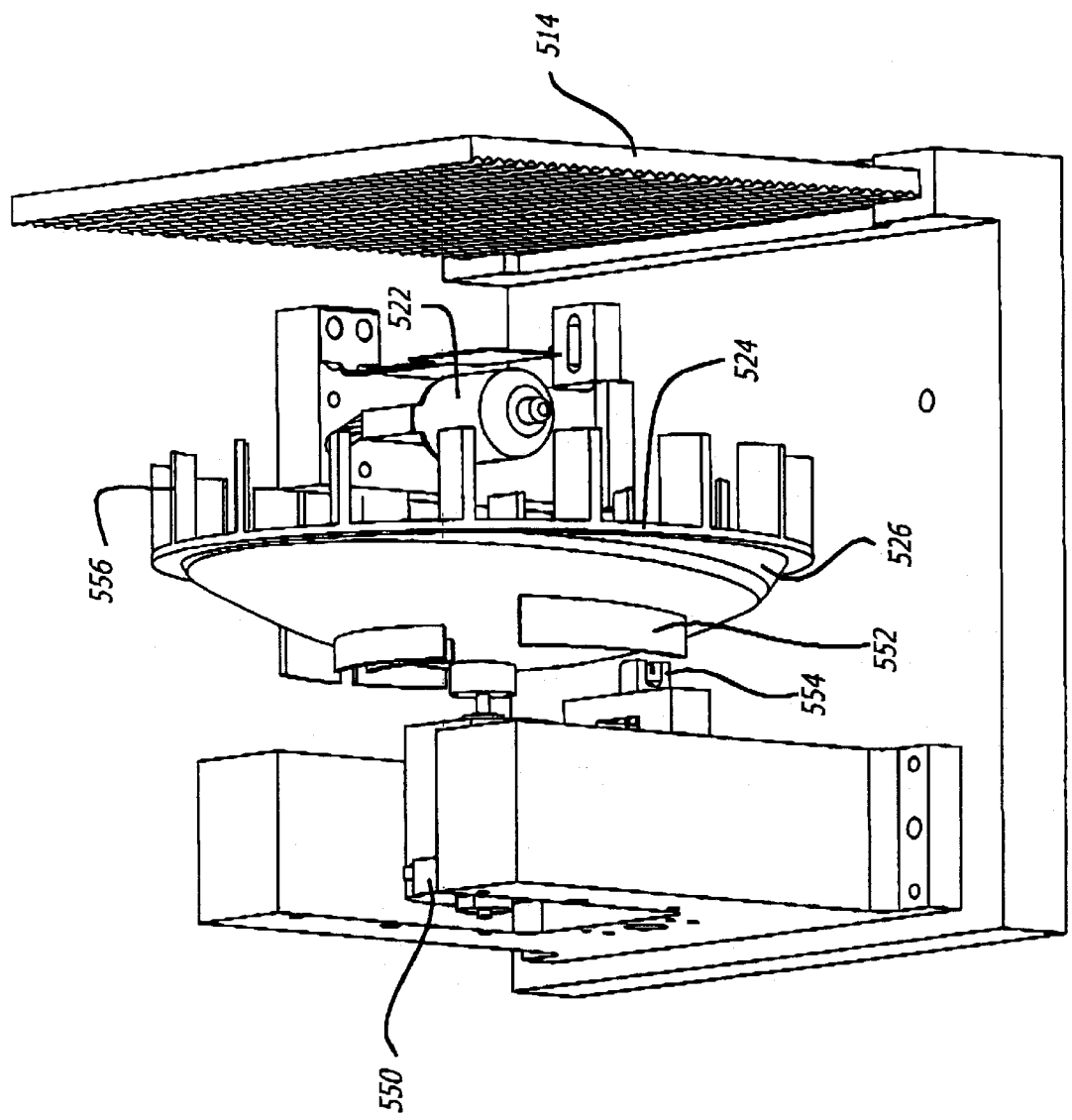
FIG. 11 is a perspective view of a projection subassembly of one embodiment of the invention.

FIG. 11 is a perspective view of a projection subassembly of one embodiment of the invention. A parabolic reflector 524 is coupled to a drive shaft of motor 550. Also coupled along the drive shaft of the motor are plurality of sensor blades 552 which interrupt an optical sensor 554 to indicate positioning of the parabolic reflector 524 during rotation. The motor shaft is positioned to be aligned with the light source 522 such that a linear extension of the motor shaft would intercept the light source 522. The parabolic reflector 524 as mounted on the shaft slightly off center. However, the tilt of the parabolic reflector 524 as mounted ensures that a focal line of the reflector intersects the light source 522 throughout the rotation. The rim 526 of reflector 524 is counterbalanced to provide for smooth rotation of the parabolic reflector 524. Fan blades 556 may be coupled to the rim 526 to assist in the evacuation of heat generated by the light source 522.

The parabolic reflector reflects a light spot from the light source 522 onto the projection spreading window 514 which is discussed in connection with a previously described embodiment has the effect of spreading the light spot into a vertical light stripe. Because the parabolic reflector is mounted off center as the motor rotates the reflector, the light spot translates through a substantially circular path on the projection window 514. As a result of the light spreading, the effect in the focal zone, some distance from the projection window, is a light bar sweeping back and forth. In this manner, two gradients may be generated and the three dimensional features calculated as described above in connection with other embodiments that sweep the light stripe through the focal zone.

Figure 12A:
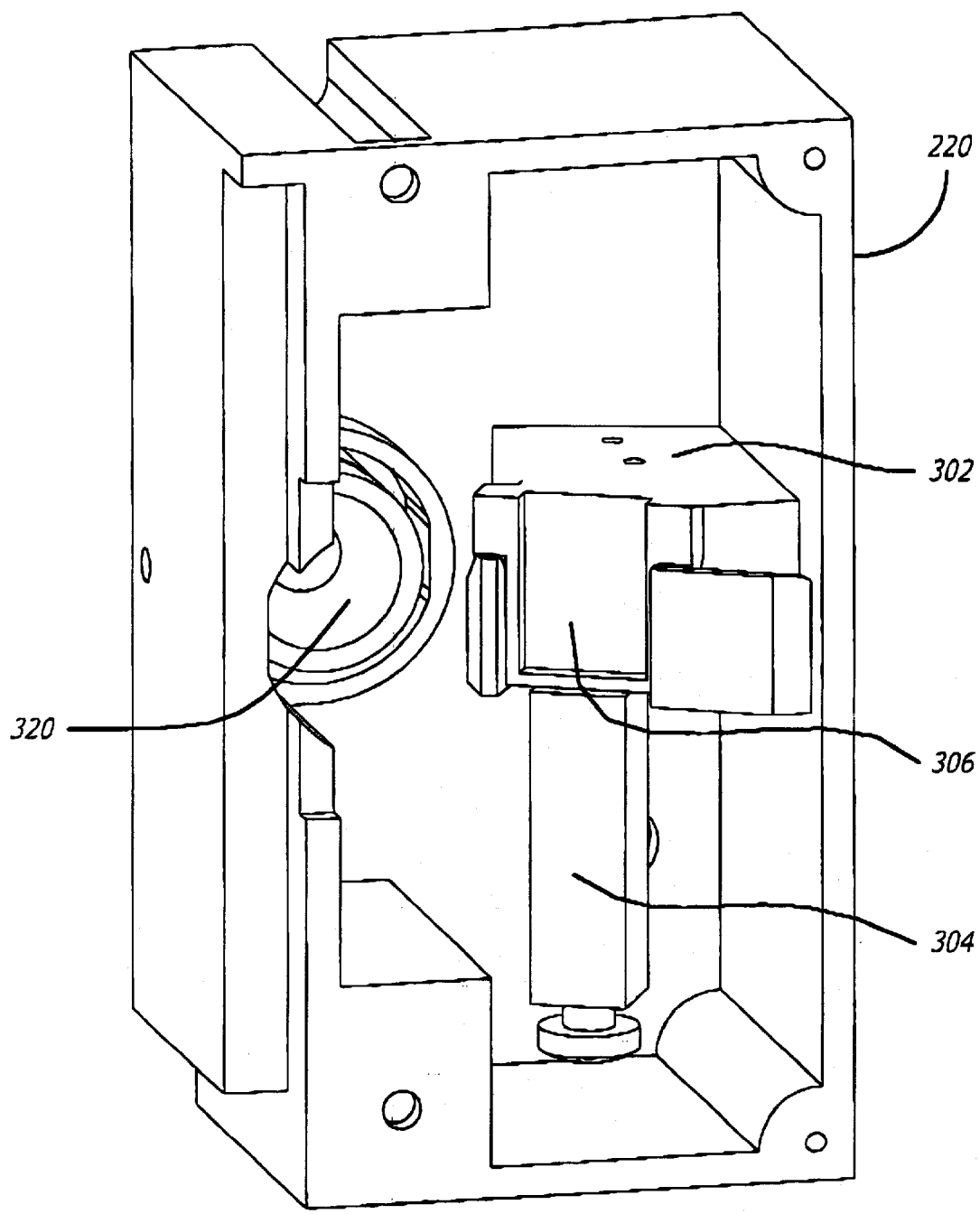
FIG. 12a is a sectional perspective view of an inclinometer disclosed within the camera case.

FIG. 12a is a sectional perspective view of an inclinometer disposed within the camera case. It has been found that a tilt of as little as 0.080 will change the imaging characteristics of the ISA where a desired resolution is 0.1 inches. Inasmuch as table surfaces may often have slopes greater than this, it is desirable to be able to detect the tilts with an accuracy of at least 0.08 within the digitizer. Once detected, the slope can be factored out in the rendering of the imaged object on the host node. The purpose of the inclinometer is to permit a determination of the amount the digitizer is tilted when resting on a surface. Thus, where the digitizer is placed on an uneven table surface, the inclinometer is used to detect the tilt to permit the subsequently rendered image to be compensated for the tilt and resulting distortion in the image captured. Since gravity provides a force having a true direction independent of the surface tilt, the tilt can be measured off a gravitational orientation unit such as a pendulum, a plum line, a liquid level, etc.

A reflector 306 is disposed on a pendulum 304. The pendulum assembly rests in fulcrum mount 302 which is coupled to the camera case 220. The mount 302, reflector 306, and pendulum 304 collectively are referred to herein as the inclinometer. The inclinometer is mounted within the camera case 220, such that regardless of the tilt, no blockage of lens 320 occurs. Since the pendulum 304 will hang true vertical, regardless of the tilt of the table, by appropriately shining a light on the reflector 306 disposed on the pendulum 304, the light is reflected to a point on the ISA (not shown), and where the light strikes indicates the tilt in the direction the turntable is facing.

Figure 12B:
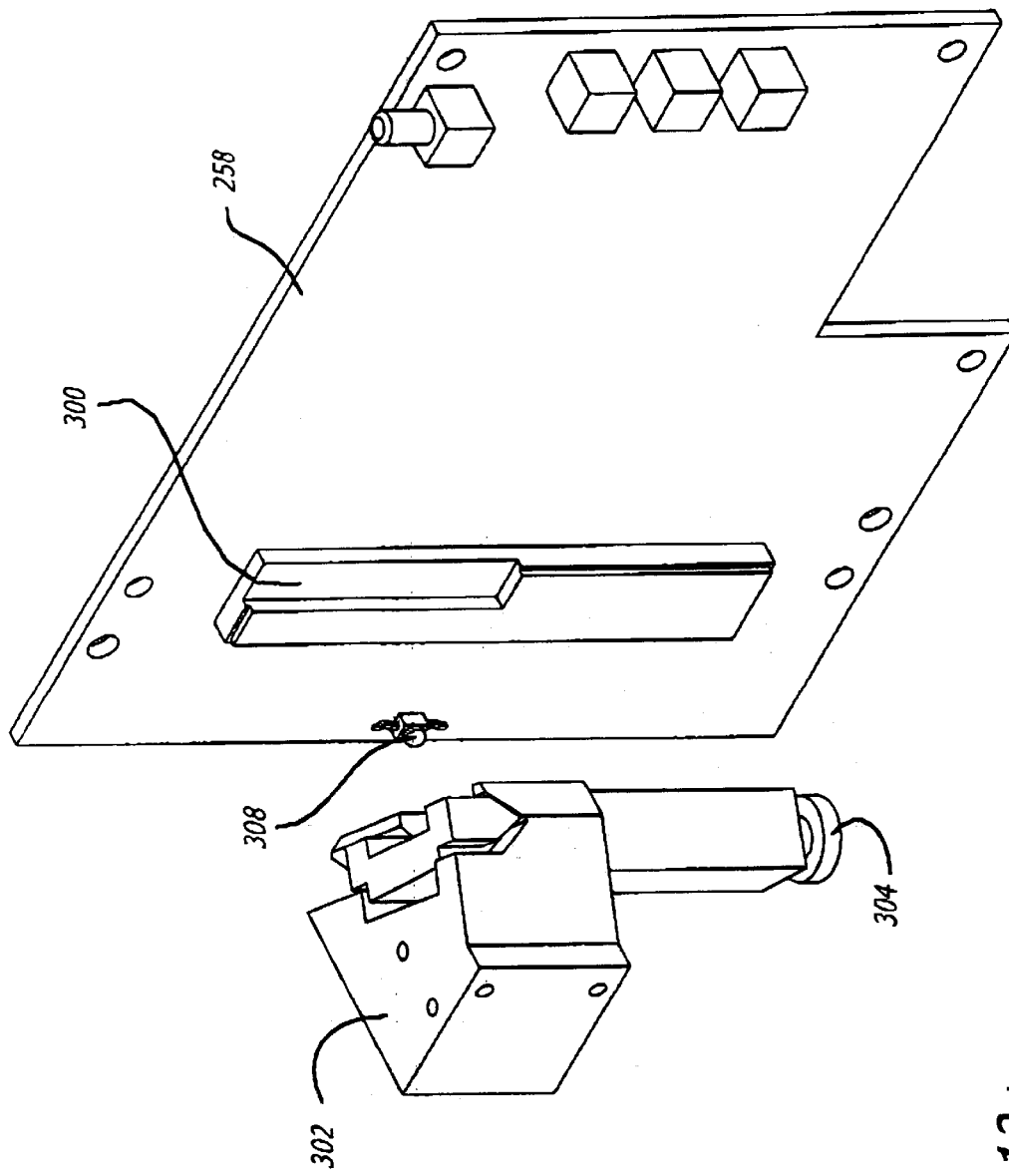
FIG. 12b is a perspective view of the inclinometer positioned relative to the image sensing array.

FIG. 12b is a perspective view of the inclinometer positioned relative to the image sensing array. The LED 308 is disposed on circuit board 258 to shine on the reflector of the inclinometer. This light is then reflected to the ISA 300. Because the fulcrum mount 302 has very low friction, the settling time of the pendulum is very high. Very low friction is desirable because it is desired that very small changes in tilt result in movement of the pendulum 304. Unfortunately, due to this long settling time, a single measurement of the reflected light may be at significant variance from the actual tilt by virtue of the swinging of the pendulum. Various ways exist to account for this in determining tilt. One is to take the maximum and minimum as the pendulum swings through its arc and average those. A second way would be to integrate over, for example, 20 seconds. Either method allows the inclinometer in conjunction with the ISA to determine to a high degree of accuracy the tilt to which the digitizer is subjected.

While the pendulum only determines a tilt in a single direction, because the upper unit of the digitizer can rotate, it can rotate by, for example, 90° and determine the tilt in the second direction, thereby determining the tilt in a second direction, and accordingly determining the combined tilt in an X and Y direction for the surface on which it is placed.

Figure 13A:
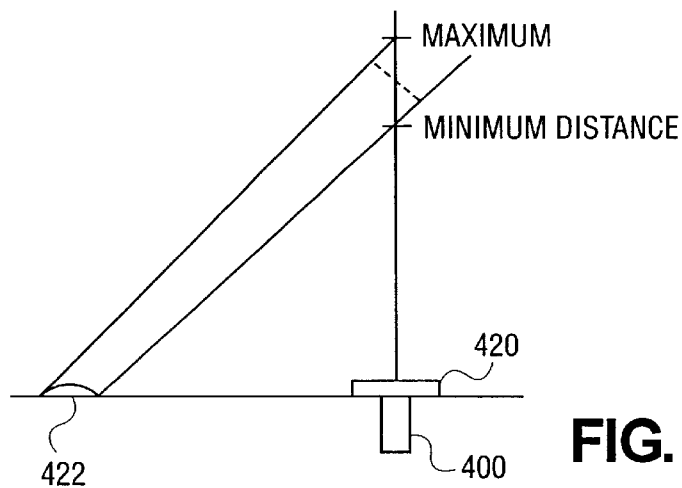
FIG. 13a is a schematic diagram of a system of one embodiment of the invention at first mode of operation.

FIG. 13a is a schematic diagram of a system of one embodiment of the invention at first mode of operation. In normal mode of operation as shown in FIG. 12a, ISA 400 is a focal line that can image an object between a minimum distance and a maximum distance perpendicularly from a lens 420. The minimum and maximum distance at which the ISA can focus dictate the maximum dimension of an object that can be imaged. It also dictates the width that the light provided by light source 422 must be when it reaches the focal zone. In a typical embodiment, the minimum distance might be four feet, and the maximum distance might be eight feet. This yields the maximum cross-dimension for the object of four feet. However, when imaging small objects, for example, the size of a penny, imaging at a distance of four feet is unlikely to yield an acceptable imaging result.

Figure 13B:
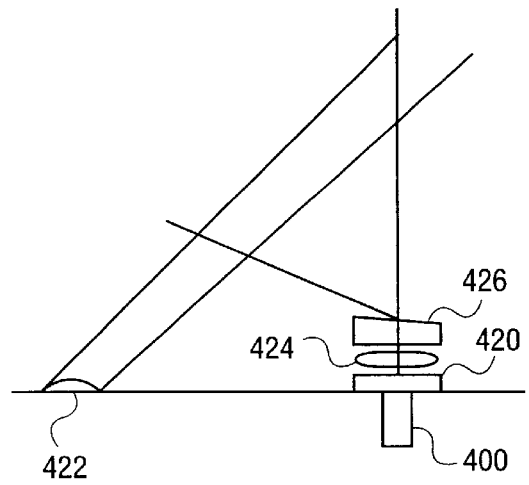
FIG. 13b is a schematic diagram of a macro lens solution to imaging small objects in one embodiment of the invention.

FIG. 13b shows a schematic diagram of a macro lens solution to imaging small objects in one embodiment of the invention. By interposing an additional lens 424 and a wedge prism 426 along the focal line of ISA 400, the focal line is bent to intersect the projected light at a point closer to the digitizer. Thus, with the additional magnification resulting from additional lens 424 and the closer focal zone caused by the wedge prism 426, significantly smaller objects can be imaged.

Figure 13C:
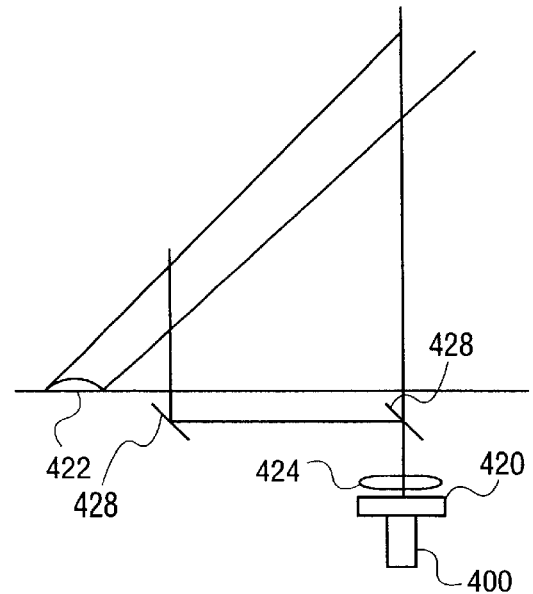
FIG. 13c is a schematic diagram of an alternative macro lens solution.

FIG. 13c is a schematic diagram of an alternative macro lens solution. In this embodiment, instead of a wedge prism, a pair of 45° reflectors 428 are used to move the focal line to intersect the light beam closer to the digitizer.

Figure 14:
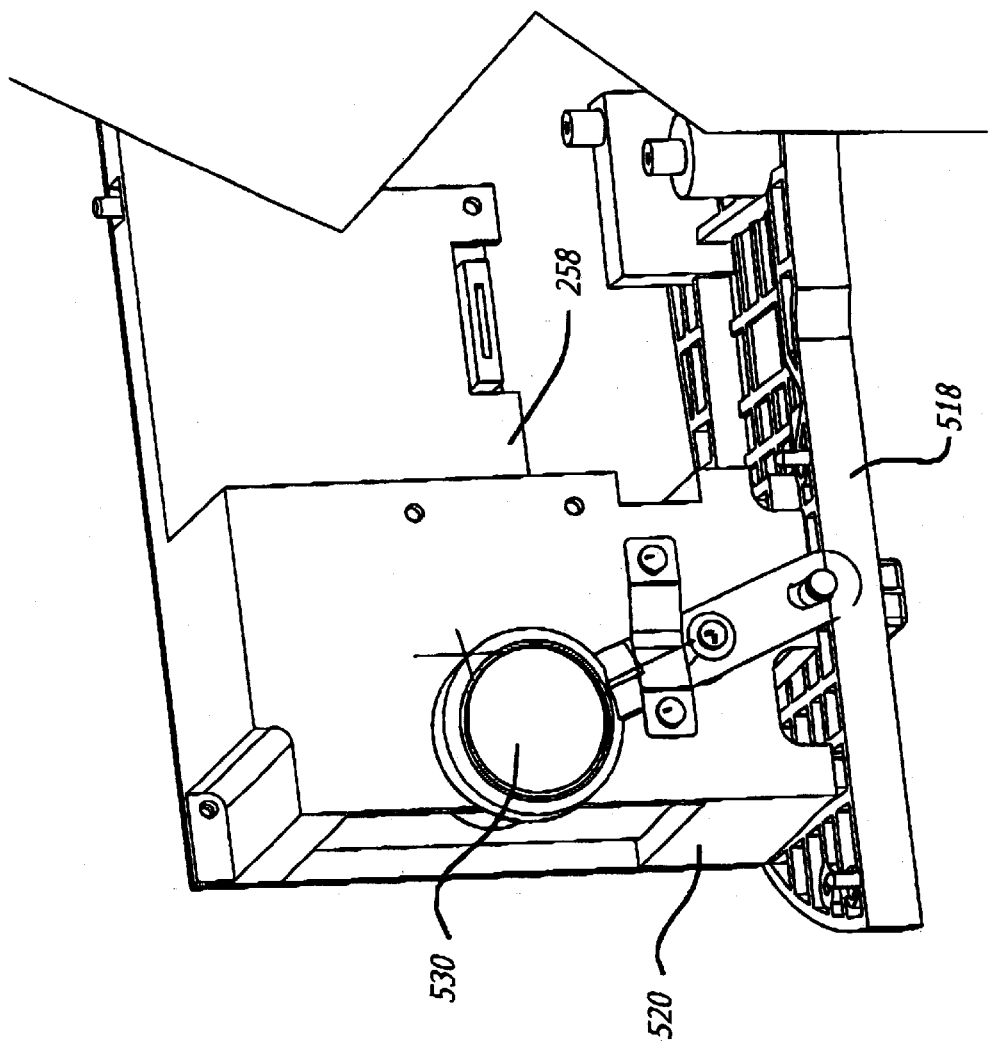
FIG. 14 is a prospective view of an imaging assembly of one embodiment of the invention.

FIG. 14 is a perspective view of an imaging assembly of one embodiment of the invention. Camera case 520 is coupled to mounting plate 518 of an upper unit and circuit board 258 on which the ISA (not shown) is mounted. A macro lens 530 is movably coupled to mounting plate 518, such that in the first position, it is interposed (as shown) in the focal line of the ISA, and in the second position, it does not impinge on the focal line of the ISA. It is envisioned that the digitizer may be switched back and forth in and out of macro mode with a toggle switch, slider, or some other mechanism which causes the macro lens to move from the first position to the second position, and vice versa.

Figure 15A:
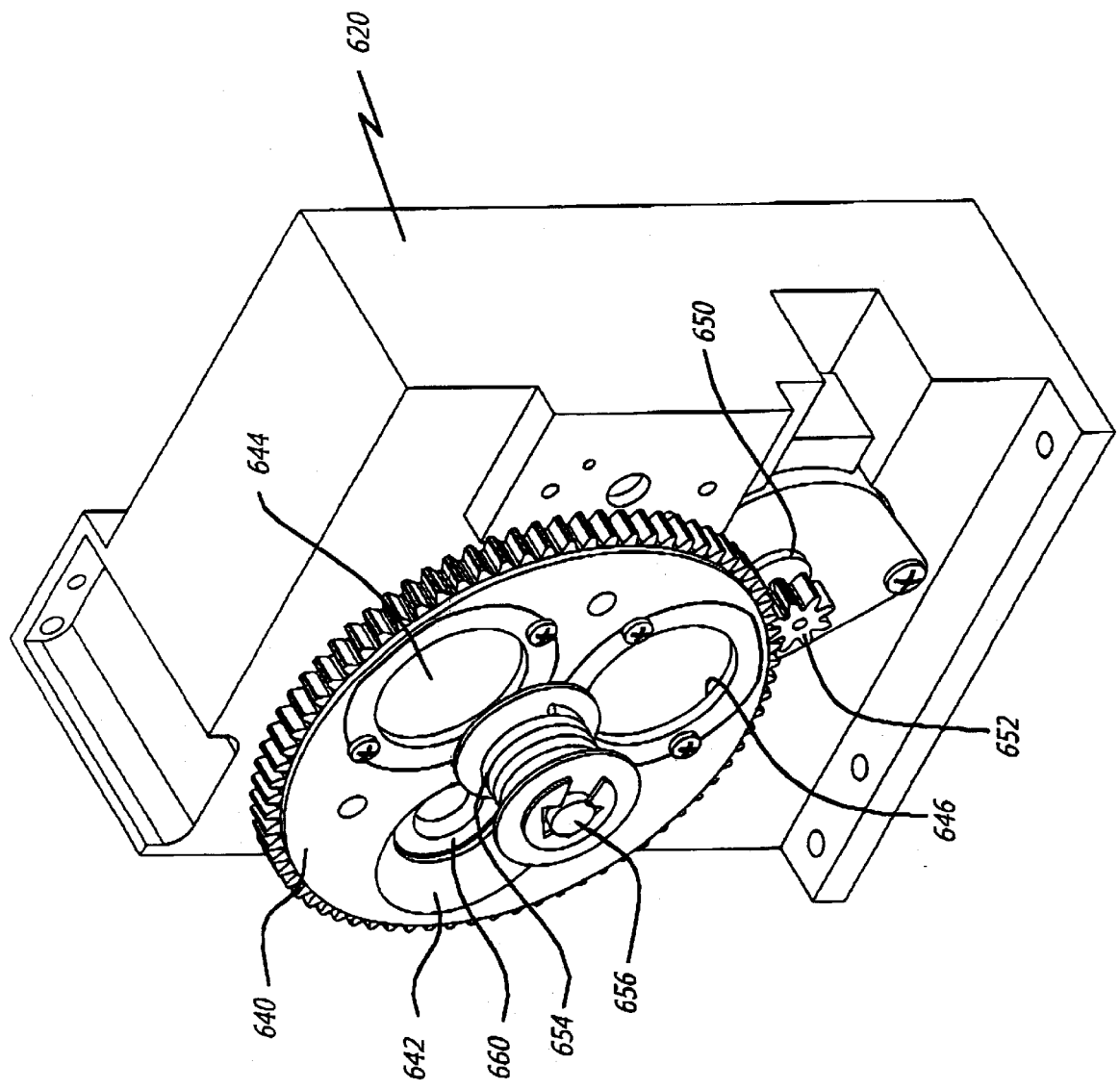
FIG. 15a is a diagram of a lens/aperture assembly of one embodiment of the invention.
Figure 15:
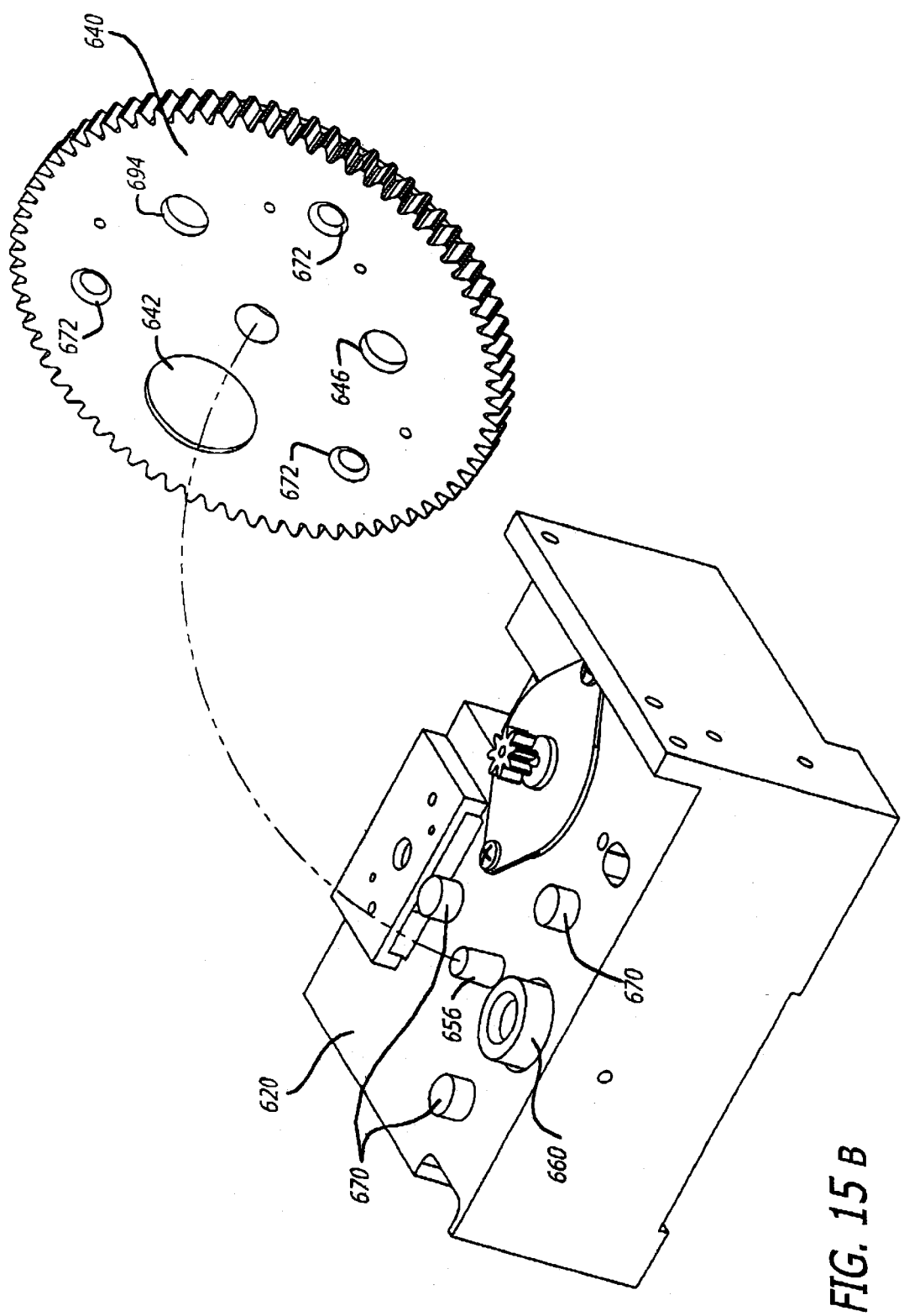

FIG. 15a is a diagram of a lens/aperture assembly of one embodiment of the invention. Camera case 620 is mounted to enclose the ISA of any of the various embodiments of the invention. A camera portal 660 provides an optical path from the ISA to the outside world. In some embodiments of the invention the camera portal 660 may include a lens barrel. Lens/aperture assembly 640 holds a plurality of lens/aperture combinations 642, 644, 646. The lens/aperture assembly 640 includes a toothed wheel mounted on a shaft 656 and biased by bias spring 654 for stability. Stepper motor 650 drives the toothed wheel via drive gear 652. The lens/aperture combinations, in one embodiment, may each be distinct lens barrels. In another embodiment the lens/aperture combination may merely be a lens and aperture to add on to an existing lens barrel for the ISA. In the second case, one of the locations on the wheel such as 642 may have no lens and provide a large enough aperture so that it does not impinge on the existing lens barrel. While three lens/aperture combinations are shown, more or fewer may be provided.

Additionally, it is within the scope and contemplation of the invention to have apertures and lenses on distinct wheels so that each aperture can be applied with each lens to yield a larger number of possible lens/aperture combinations. One embodiment has three possible combinations, one for distant three-dimensional imaging, one for distant two-dimensional imaging and one for close-up two- and three-dimensional imaging. In one embodiment, the selection of the lens/aperture combination may be based on input from a user at a host. Once the user identifies the conditions, e.g., desired focal distance, the correct lens/aperture assembly is positioned by the system automatically. In another embodiment, the digitizer itself identifies the correct lens/aperture combination in the course of its acquisition of the orientation fixture. For example, if the digitizer sweeps looking for the turntable using the distance three-dimensional lens and does not find the turntable, it may then transition to the close-up three-dimensional lens/apparatus combination and sweep again. If the turntable is then found, the close-up combination is selected. In another example, the digitizer may sweep looking for the turntable and then select a correct combination for the turntable at the distance it is found. It should be understood that this is merely illustrative and other methods of lens/aperture combination selection are within the scope and contemplation of the invention.

FIG. 15b is an exploded view of the assembly of FIG. 15a. Camera portal 660 is shown along with positioning posts 670. Positioning posts 670 engage recesses 672 in the back surface of lens/aperture assembly 640. In this manner proper alignment of the lens/aperture combination over the camera portal 660 is assured. When a transition between lens/aperture combination is desired, the stepper motor 650 drives the wheel to approximately align the desired lens. The bias spring (not shown) biases the recesses 672 over the posts 670 such that the desired consistent alignment is achieved. In this manner because the alignment will be consistent from one use of the lens/aperture combination to the next, an initial calibration will compensate for any deviation caused by manufacturing tolerances.

A majority of the discussion above has been related to scanning an object rotated by a turntable some distance from the scanner, or in the alternative, a two-dimensional scan (of an object that is not rotated). However, the same digitizer configuration can be used to, for example, image a room from the inside creating a panoramic three-dimensional view. For example, by setting the digitizer near the center of the room and allowing it to rotate somewhat more than 360° while scanning, it will image its surroundings. It is then a software matter for the host to reconstruct the room.

In another mode of operation, the system may be used in a modified stereographic image techniques. The system uses the turntable under the digitizer control to present two aspects of the object to the digitizers. By capturing two dimensional images of both aspects using the ISA described above, two very high resolution pictures are created. These pictures may then be used to construct a three-dimensional image following known stereoscopic techniques. In some cases, it may be desirable to use multiple image capture techniques to ensure the best possible resulting image. Thus, for example, the digitizer may capture the target object using the earlier described intensity gradient based imaging and then also capture the image in a stereoscopic mode. By comparing and/or averaging the resulting images, certain anomalies resulting from either technique alone may be eliminated.

It is desirable that the upper unit not be permitted to rotate indefinitely in one direction, as such rotation could cause damage to the connecting cables and create additional stresses in the system degrading the system's longevity. However, a hard stop is not feasible, because that would prevent the rotation of greater than 360° which is required to ensure a good matchup of a 360° panoramic image. One solution to this is to provide a stop which shifts in, for example, a 30° arc but has hard stops on the extremes of that arc. In this manner, the digitizer can rotate clockwise until the shifting stop reaches its hard stop at the far edge of the 30° arc. Then scanning can begin in a counter-clockwise direction and continue until the sliding stop has been pushed back across its 30° arc to the opposite side hard stop. In this manner, the digitizer can scan a 390° arc. Larger and smaller arc stops are within the scope and contemplation of the invention.

In the foregoing specification, the invention has been described with reference to specific embodiments thereof. In some cases, certain subassemblies are only described in detail with one such embodiment. Nevertheless, it is recognized and intended that such subassemblies may be used in other embodiments of the invention. It will also be evident that various modifications and changes can be made to the specific embodiments described without departing from the broader spirit and scope of the invention as set forth in the appended claims. The specification and drawings are, accordingly, to be regarded in an illustrative rather than a restrictive sense.

What is claimed is:

1. A method comprising:

varying illumination within a focal zone over time and location to create a spatially distributed gradient of light intensity;

projecting the gradient onto an object;

capturing a measurement for a light intensity at a point on the object, which relates to location of the point along the gradient;

deriving dimensional data for the point based on the measurement; and assembling the dimensional data along with dimensional data similarly captured for a set of other points on the object into a three-dimensional model of at least a portion of the object.

2. The method of claim 1 wherein projecting comprises:

forming a stripe of light having a width, the stripe to illuminate the object; and moving the stripe of light across a focal zone at least until a portion of the stripe has traversed the entire focal zone.

3. The method of claim 1 wherein capturing comprises:

integrating the illumination intensity within the focal zone during one capture period.

4. A method comprising:

projecting a spatially distributed gradient of light intensity onto an object;

capturing a measurement for a light intensity at a point on the object, which relates to location of the point along the gradient;

creating a ratio of measurements for the point corresponding to intensity at the point under a plurality of lighting conditions to derive dimensional data for the point; and assembling the dimensional data along with dimensional data similarly captured for a set of other points on the object into a three-dimensional model of at least a portion of the object.

5. A method comprising:

projecting a spatially distributed gradient of light intensity onto an object;

capturing a measurement for a light intensity at a point on the object, which relates to location of the point along the gradient;

deriving dimensional data for the point based on the measurement; and assembling the dimensional data along with dimensional data similarly captured for a set of other points on the object into a three-dimensional model of at least a portion of the object; and wherein the capturing is performed by a linear image sensing array and a focal zone is a single line of points on the object.

6. An apparatus comprising:

a projection unit to project a spatially distributed gradient of light intensity onto an object including a curved reflector mounted radially asymmetrically on a rotatable shaft and a light source disposed to be in a focal line of the curved reflector while rotated; and a capture unit that measure light intensity at a plurality of points on the object, the light intensity at each point indicative of a location of that point along the gradient.

7. The apparatus of claim 6 further comprising:

a light spreader interposed between the curved reflector and a focal zone.

8. An apparatus comprising:

a projection unit to project a spatially distributed gradient of light intensity onto an object including a reflector, a light source to illuminate at least a portion of the reflector and a drive unit coupled to the reflector to drive the reflector to sweep incident light from the light source through a focal zone; and a capture unit that measures light intensity at a plurality of points on the object, the light intensity at each point indicative of a location of that point along the gradient.

9. The apparatus of claim 8 wherein the projection unit further comprises:

a light spreader interposed between the reflector and the focal zone.

10. The apparatus of claim 8 wherein the reflector is curved to cause light from the light source to form a light stripe.

11. An apparatus comprising:

a projection unit to project a spatially distributed gradient of light intensity onto an object including a light source and a variable shutter to prevent a first percentage to a second percentage of light from the light source from illuminating a focal zone during a capture period; and a capture unit that measures light intensity at a plurality of points on the object, the light intensity at each point indicative of a location of that point along the gradient.

12. The apparatus of claim 6 wherein the projection unit and the capture unit are retained in fixed relation to each other.

13. A method comprising:

rotating an element in an optical path relative to an object to sweep a focal zone of an image sensing array (ISA) over a portion of the object independent of motion of the object; and capturing data in the ISA which can be used to determine three-dimensional data for the object within the portion over which the focal zone sweeps.

14. The method of claim 13 further comprising:

repeating the rotating and capturing for a plurality of aspects of the object.

15. The method of claim 13 further comprising:

assembling from the data captured a three-dimensional model of at least a portion of the object.

16. The method of claim 13 wherein the ISA is a linear image sensor.

17. A method comprising:

moving an element in an optical path relative to an object to sweep a focal zone of a linear image sensor over a portion of the object;

capturing in the linear image sensor successive lines of data as the focal zone sweeps, which can be used to determine three-dimensional data for the object within the portion of the object over which the focal zone sweeps.

18. The method of claim 17 further comprising:

repeating the moving and capturing for a plurality of aspects of the object.

19. The method of claim 17 further comprising:

assembling from the data captured a three-dimensional model of at least a portion of the object.

* * * * *